United States Patent
Ikedo

(10) Patent No.: US 10,136,086 B2
(45) Date of Patent: Nov. 20, 2018

(54) IMAGE PICKUP APPARATUS AND IMAGE PICKUP METHOD

(71) Applicant: CANON KABUSHIKI KAISHA, Tokyo (JP)

(72) Inventor: Hideki Ikedo, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/296,764

(22) Filed: Oct. 18, 2016

(65) Prior Publication Data
US 2017/0142359 A1    May 18, 2017

(30) Foreign Application Priority Data

Nov. 12, 2015   (JP) ................... 2015-222152
Jun. 28, 2016   (JP) ................... 2016-127627

(51) Int. Cl.
| H04N 5/365 | (2011.01) |
| H04N 5/345 | (2011.01) |
| H04N 5/347 | (2011.01) |
| H04N 5/361 | (2011.01) |
| H04N 5/369 | (2011.01) |

(52) U.S. Cl.
CPC .......... *H04N 5/3653* (2013.01); *H04N 5/347* (2013.01); *H04N 5/3452* (2013.01); *H04N 5/361* (2013.01); *H04N 5/3655* (2013.01); *H04N 5/3696* (2013.01)

(58) Field of Classification Search
CPC .................................................. H04N 5/3653
USPC ........................................................... 348/245
See application file for complete search history.

(56) References Cited

U.S. PATENT DOCUMENTS

| 7,889,260 B2 * | 2/2011 | Hagiwara | ............. H04N 9/045 348/316 |
| 2009/0021606 A1 * | 1/2009 | Kuruma | ................ H04N 5/361 348/231.99 |

FOREIGN PATENT DOCUMENTS

| JP | 2001-83407 | 3/2001 |
| JP | 2004-222154 | 8/2004 |

* cited by examiner

*Primary Examiner* — Joel Fosselman
(74) *Attorney, Agent, or Firm* — Fitzpatrick, Cella, Harper & Scinto

(57) ABSTRACT

An image pickup apparatus, including: a pixel array in which a first row group is to be read in a first mode for reading a signal corresponding to combined electric charges that are obtained by combining electric charges generated by the plurality of photoelectric converters, and a second row group is to be read in a second mode for reading a signal corresponding to electric charges that are generated by any one of the plurality of photoelectric converters; a correction value generating unit configured to generate a first and a second correction value for correcting a signal that is read in the first and the second mode, respectively, a correction unit configured to correct, by using the first correction value, the signal that is read in the first mode, and to correct, by using the second correction value, the signal that is read in the second mode.

19 Claims, 23 Drawing Sheets

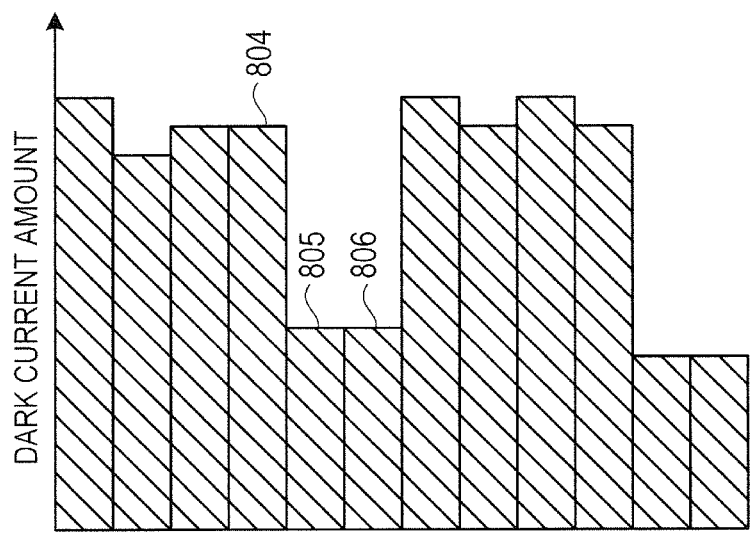
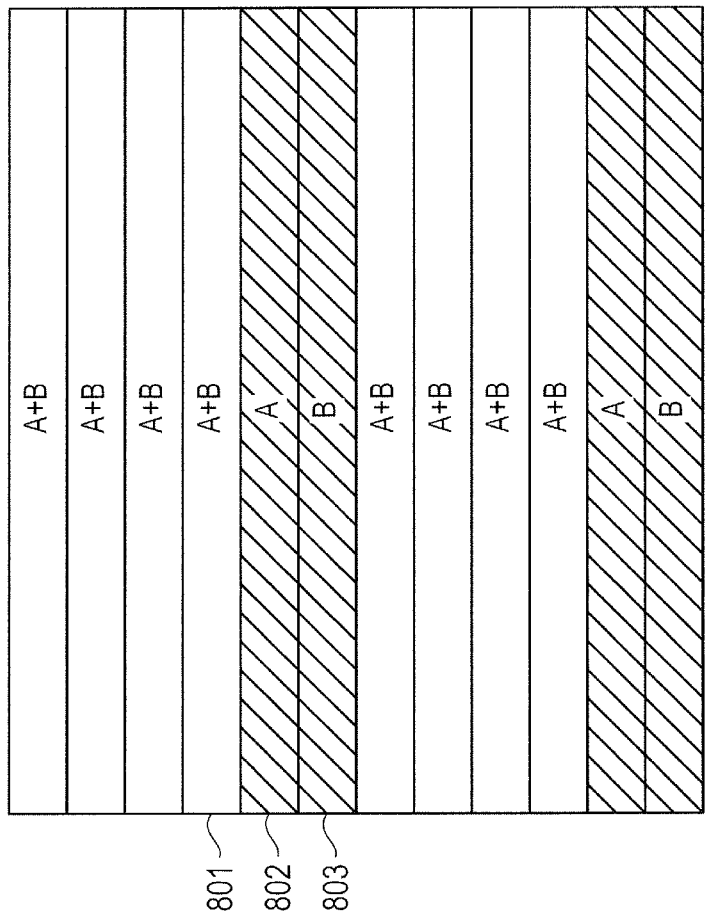

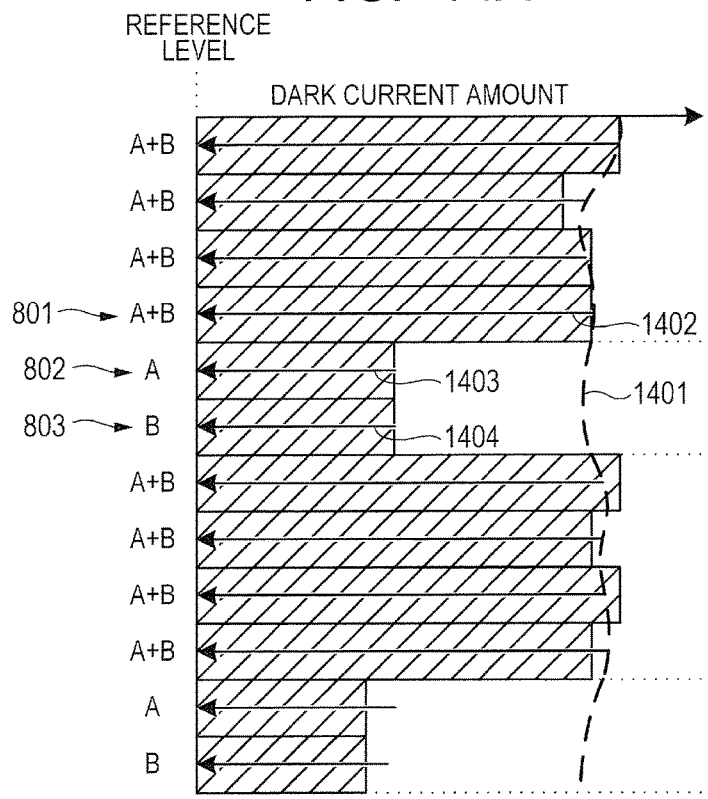
FIG. 14A
FIG. 14B
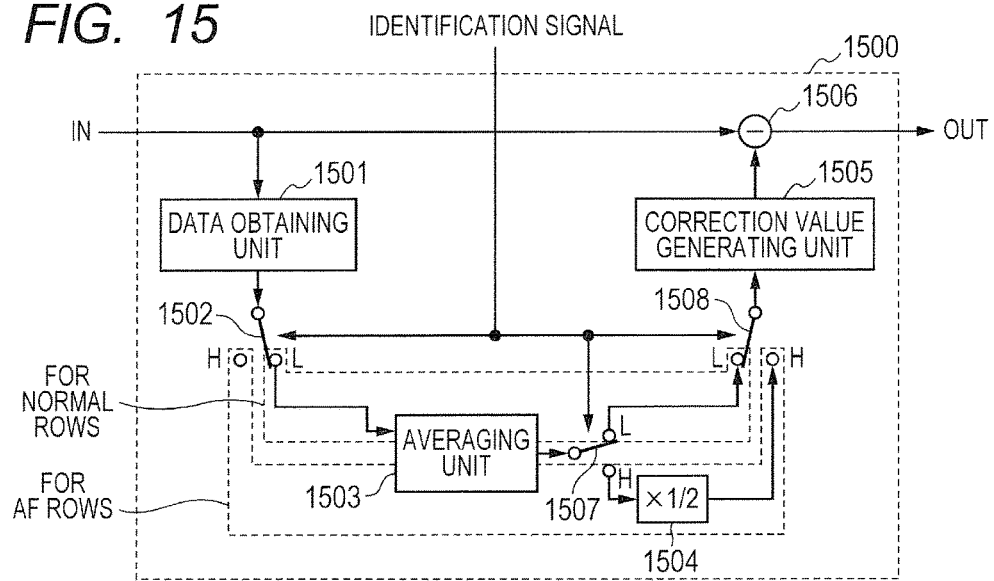
FIG. 15

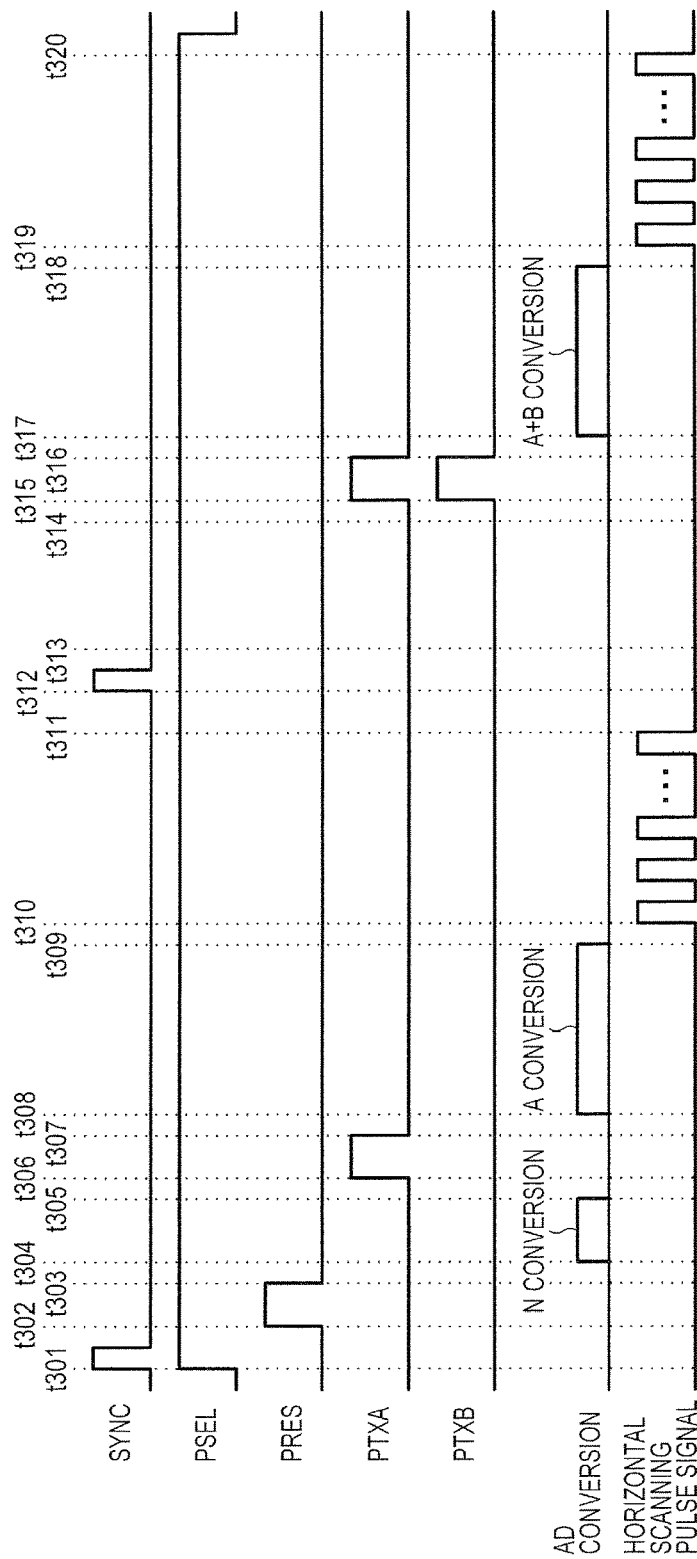

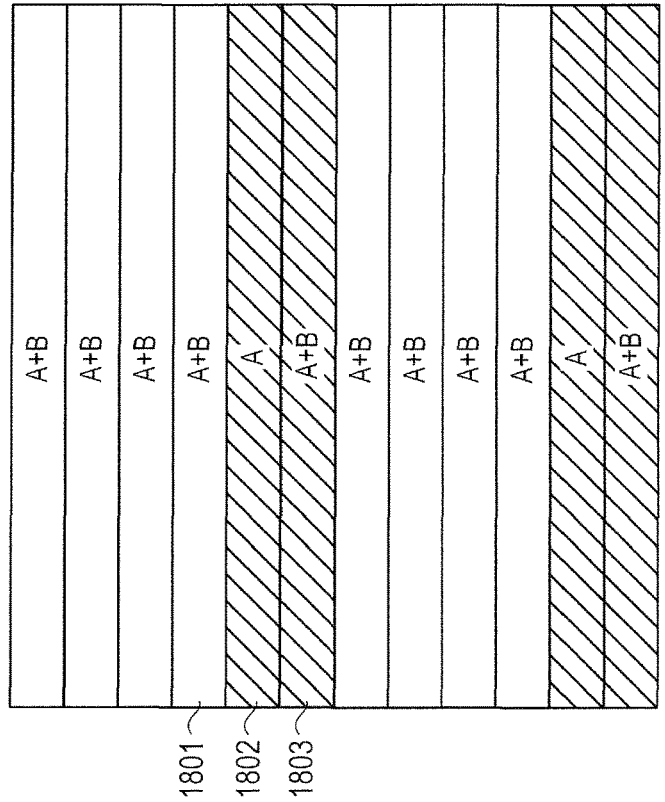

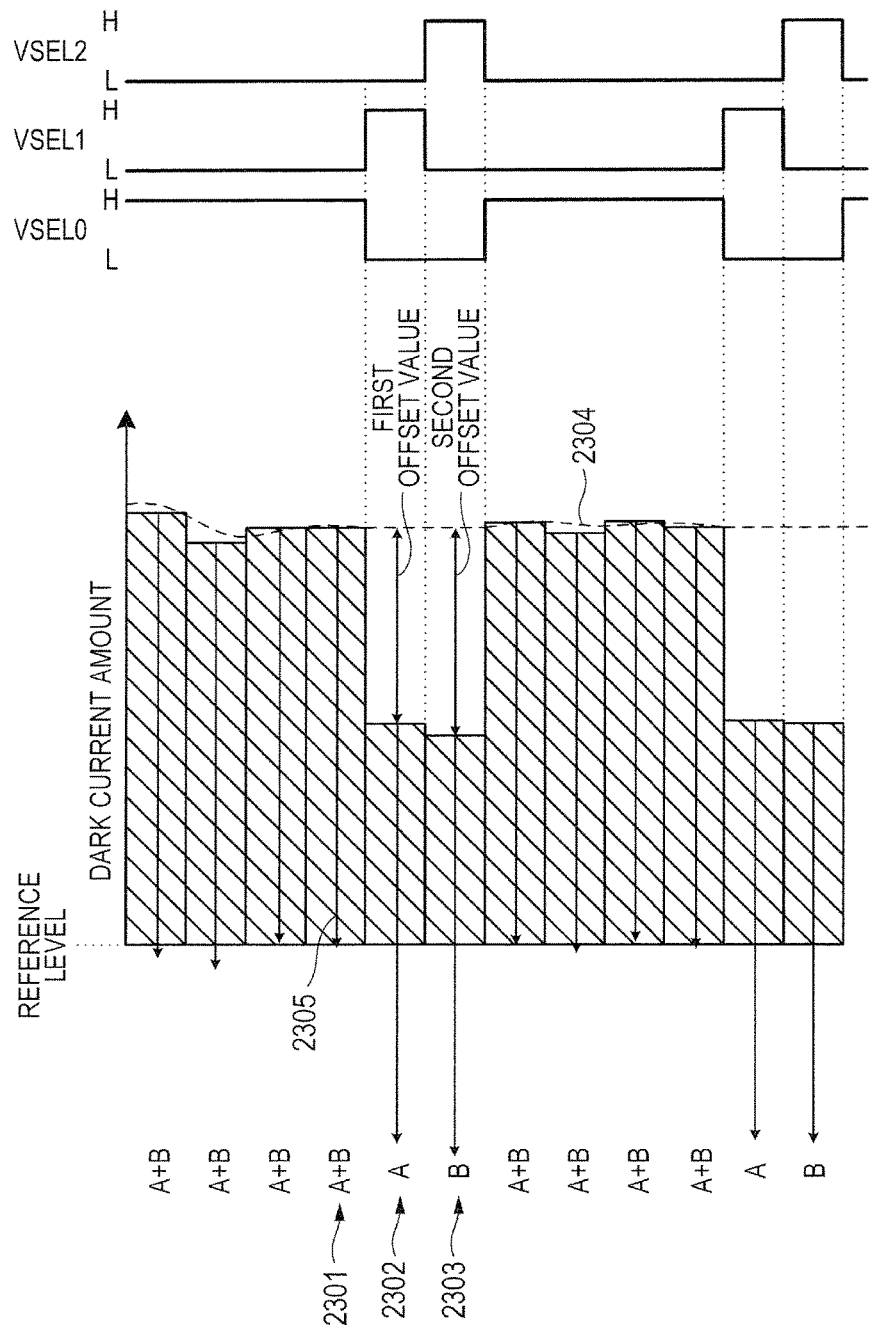

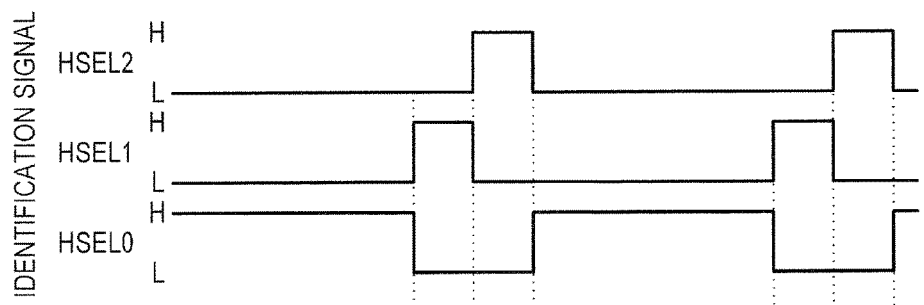
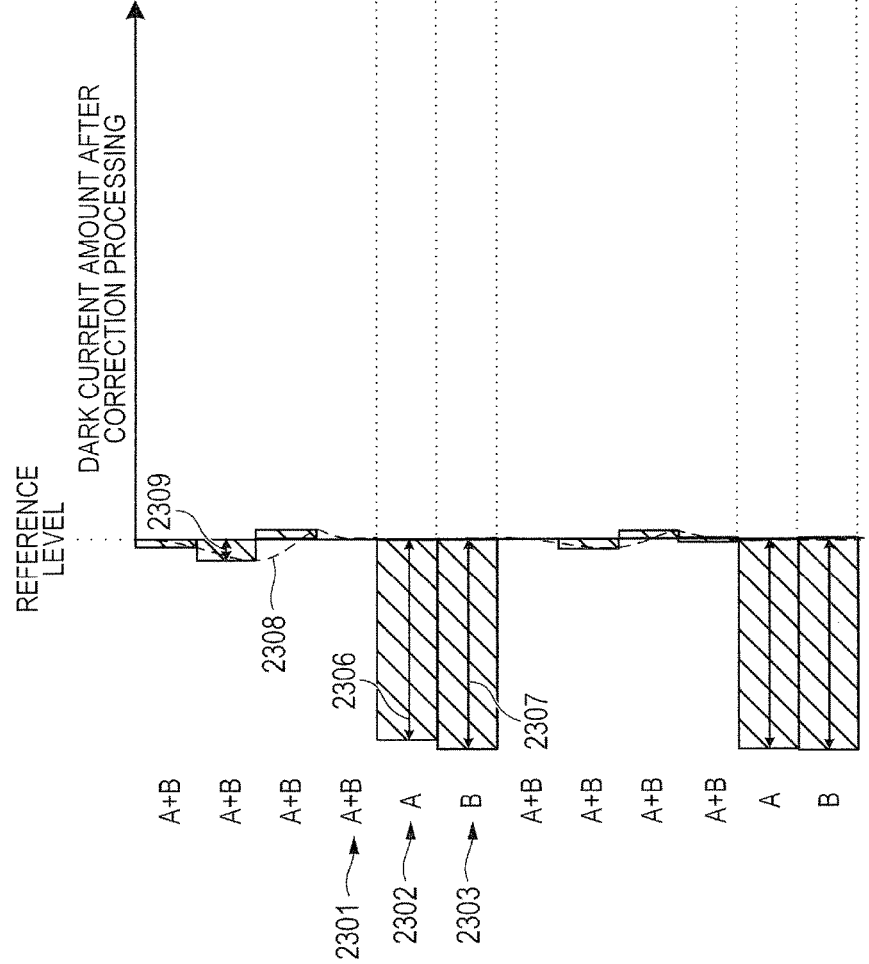

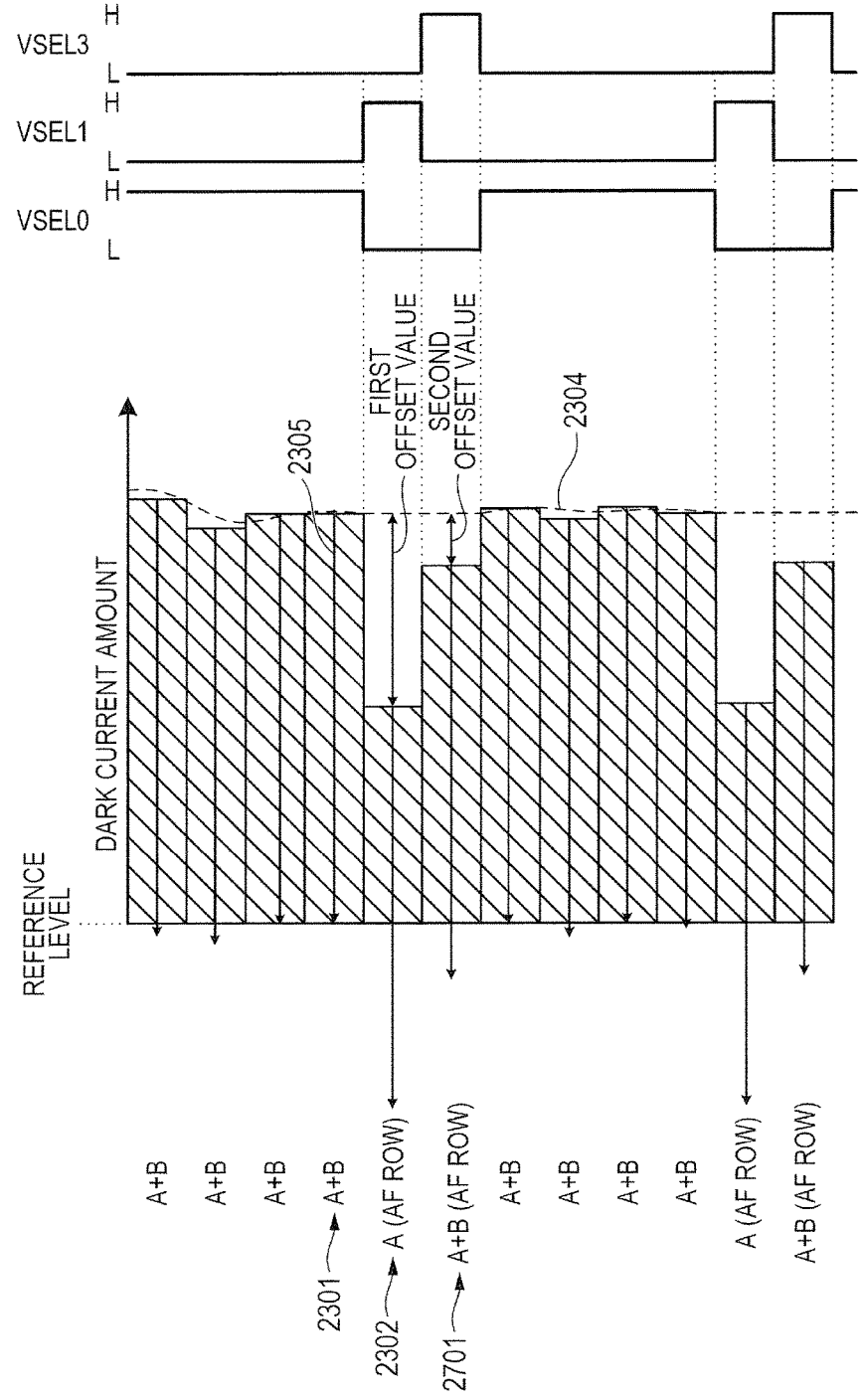

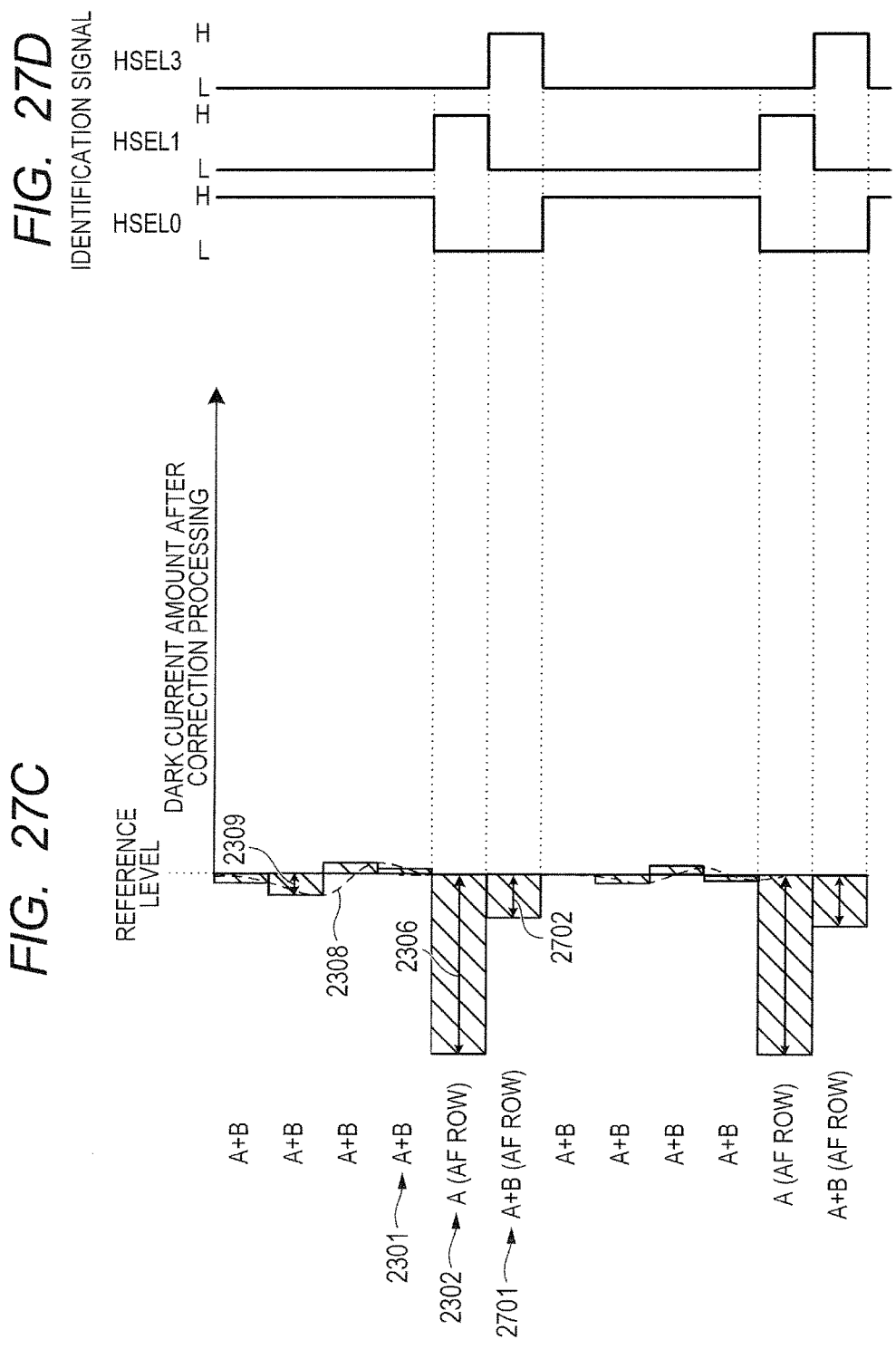

IMAGE PICKUP APPARATUS AND IMAGE PICKUP METHOD

BACKGROUND OF THE INVENTION

Field of the Invention

The present disclosure relates to an image pickup apparatus and an image pickup method.

Description of the Related Art

In recent years, more and more solid-state image pickup elements that are used in image pickup apparatus such as digital still cameras and digital video cameras are given multiple functions.

A technology related to a solid-state image pickup element capable of pupil-division focus detection is described in Japanese Patent Application Laid-Open No. 2001-083407. In Japanese Patent Application Laid-Open No. 2001-083407, two photodiodes are provided for one pixel associated with one microlens. The photodiodes therefore receive light fluxes that have passed through different areas of an exit pupil of a photographic lens. The focal point may be detected by comparing signals that are output separately from the two photodiodes with each other. The signals from the two photodiodes are added as an added signal, based on which a photographed image may be obtained.

There is described in Japanese Patent Application Laid-Open No. 2004-222154 how a black level correction value is obtained for a slave photosensitive pixel by multiplying the black level correction value of its master photosensitive pixel by an area ratio that is the ratio of the cell area of the master photosensitive pixel and the cell area of the slave photosensitive pixel.

However, the black level cannot always be corrected properly in image pickup apparatus of the related art.

SUMMARY OF THE INVENTION

According to one aspect of an embodiment, there is provided an image pickup apparatus, including: a pixel array including a plurality of unit pixels arranged into a matrix pattern, the plurality of unit pixels each including a plurality of photoelectric converters, some of the plurality of unit pixels located in a first row group being to be read in a first mode for reading a signal corresponding to combined electric charges that are obtained by combining electric charges separately generated by the plurality of photoelectric converters of each of the plurality of unit pixels, some others of the plurality of unit pixels located in a second row group, which is different from the first row group, being to be read in a second mode for reading a signal corresponding to electric charges that are generated by any one of the plurality of photoelectric converters of each of the plurality of unit pixels; a correction value generating unit configured to generate a first correction value for correcting a signal that is read in the first mode out of the unit pixel that is located in a light-receiving pixel area of the pixel array, and to generate a second correction value that is different from the first correction value, for correcting a signal that is read in the second mode out of the unit pixel that is located in the light-receiving pixel area, the first correction value and the second correction value being generated based on signals that are read out of the unit pixels that are located in a reference pixel area of the pixel array; and a correction unit configured to correct, by using the first correction value, the signal that is read in the first mode out of the unit pixel that is located in the light-receiving pixel area, and to correct, by using the second correction value, the signal that is read in the second mode out of the unit pixel that is located in the light-receiving pixel area.

According to another aspect of an embodiment, there is provided an image pickup method, including: reading signals in a first mode out of unit pixels that are located in a first row group of a pixel array, the pixel array including a plurality of unit pixels arranged into a matrix pattern, the plurality of unit pixels each including a plurality of photoelectric converters, the first mode involving reading a signal corresponding to combined electric charges that are obtained by combining electric charges that are separately generated by the plurality of photoelectric converters of each of the plurality of unit pixels; generating a first correction value for correcting a signal that is read in the first mode out of the unit pixel that is located in a light-receiving pixel area of the pixel array, based on signals that are read out of the unit pixels that are located in a reference pixel area of the pixel array; correcting, by using the first correction value, the signal that is read in the first mode out of the unit pixel that is located in the light-receiving pixel area; reading signals in a second mode out of the unit pixels that are located in a second row group, which is different from the first row group, the second mode involving reading a signal corresponding to electric charges that are generated in any one of the plurality of photoelectric converters of each of the plurality of unit pixels; generating a second correction value that is different from the first correction value, for correcting a signal that is read in the second mode out of the unit pixel that is located in the light-receiving pixel area, based on signals that are read out of the unit pixels that are located in the reference pixel area of the pixel array; and correcting, by using the second correction value, the signal that is read in the second mode out of the unit pixel that is located in the light-receiving pixel area.

According to further another aspect of an embodiment, there is provided a non-transitory computer-readable storage medium storing a program for causing a computer to: read signals in a first mode out of unit pixels that are located in a first row group of a pixel array, the pixel array including a plurality of unit pixels arranged into a matrix pattern, the plurality of unit pixels each including a plurality of photoelectric converters, the first mode involving reading a signal corresponding to combined electric charges that are obtained by combining electric charges that are separately generated by the plurality of photoelectric converters of each of the plurality of unit pixels; generate a first correction value for correcting a signal that is read in the first mode out of the unit pixel that is located in a light-receiving pixel area of the pixel array, based on signals that are read out of the unit pixels that are located in a reference pixel area of the pixel array; correct, by using the first correction value, the signal that is read in the first mode out of the unit pixel that is located in the light-receiving pixel area; read signals in a second mode out of the unit pixels that are located in a second row group, which is different from the first row group, the second mode involving reading a signal corresponding to electric charges that are generated in any one of the plurality of photoelectric converters of each of the plurality of unit pixels; generate a second correction value that is different from the first correction value, for correcting a signal that is read in the second mode out of the unit pixel that is located in the light-receiving pixel area, based on signals that are read out of the unit pixels that are located in the reference pixel area of the pixel array; and correct, by using the second correction value, the signal that is read in the second mode out of the unit pixel that is located in the light-receiving pixel area.

Further features of the present invention will become apparent from the following description of exemplary embodiments with reference to the attached drawings.

BRIEF DESCRIPTION OF THE DRAWINGS

FIGS. 8A and 8B are diagrams for illustrating an example of output signals and dark current amount.

FIGS. 14A and 14B are conceptual diagrams for illustrating processing that is executed in the correction processing unit of the image pickup apparatus according to the second embodiment.

FIG. 15 is a block diagram for illustrating a correction processing unit of an image pickup apparatus according to a third embodiment of the present invention.

FIG. 17 is a timing chart for illustrating an operation of reading an AF row in an image pickup apparatus according to a fourth embodiment of the present invention.

FIGS. 18A, 18B and 18C are diagrams for illustrating an example of an output image and dark currents in the image pickup apparatus according to the fourth embodiment.

FIGS. 23A, 23B, 23C and 23D are conceptual diagrams for illustrating processing that is executed in a correction processing unit of an image pickup apparatus according to a fifth embodiment of the present invention.

FIGS. 27A, 27B, 27C and 27D are conceptual diagrams for illustrating processing that is executed in a correction processing unit of an image pickup apparatus according to a sixth embodiment of the present invention.

DESCRIPTION OF THE EMBODIMENTS

Preferred embodiments of the present invention will now be described in detail in accordance with the accompanying drawings.

First Embodiment

An image pickup apparatus and image pickup method according to a first embodiment of the present invention are described with reference to FIG. 1 to FIG. 12.

The image pickup apparatus according to this embodiment is provided with a correction processing unit 502 capable of correcting a black level properly. The correction processing unit 502 may be provided inside an image pickup element 1000 or outside the image pickup element 1000. The term "image pickup apparatus" herein refers to the image pickup element 1000 in some cases, and to the entire image pickup system including the image pickup element 1000 in other cases.

Figure 1:
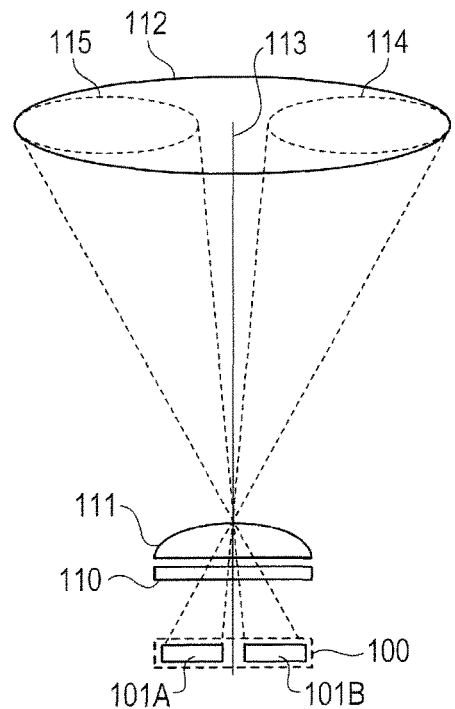
FIG. 1 is a conceptual diagram for illustrating the relation between an exit pupil of a photographic lens and a unit pixel.

The principle of focus detection by a pupil division method that is executed in the image pickup apparatus according to this embodiment is described first with reference to FIG. 1. FIG. 1 is a conceptual diagram for illustrating the relation between an exit pupil of a photographic lens and a unit pixel.

A unit pixel 100 includes a plurality of photodiodes (photoelectric converters), specifically, a photodiode 101A and a photodiode 101B. A color filter 110 and a microlens 111 are placed above the unit pixel 100.

Light that has passed through an exit pupil 112 of a photographic lens 1002 (see FIG. 2) enters the unit pixel 100 with an optical axis 113 at the center of the unit pixel 100. A light flux passing through a pupil area 114, which is one of partial areas of the exit pupil 112 of the photographic lens 1002, travels through the microlens 111 and is received by the photodiode 101A. Meanwhile, a light flux passing through a pupil area 115, which is the other partial area of the exit pupil 112 of the photographic lens 1002, travels through the microlens 111 and is received by the photodiode 101B. In this way, the photodiode 101A and the photodiode 101B thus separately receive light fluxes that have passed through different pupil areas, 114 and 115, of the exit pupil 112 of the photographic lens 1002. This means that a phase difference can be detected by comparing a signal that is output from the photodiode 101A and a signal that is output from the photodiode 101B.

The signal obtained from the photodiode 101A, namely, a signal based on electric charges that are generated in the photodiode 101A, is defined as an A image signal. The signal obtained from the photodiode 101B, namely, a signal based on electric charges that are generated in the photodiode 101B, is defined as a B image signal. A signal synthesized from an A image signal and a B image signal, namely, a signal based on combined electric charges that are obtained by combining electric charges generated in the photodiode 101A and in the photodiode 101B, is defined as an A+B image signal. The A+B image signal can be used as a photographed image. A row where an A image signal and a B image signal are read out of each unit pixel 100 is referred to as "AF row". A group of rows where an A image signal and a B image signal are read out of each unit pixel 100 is referred to as "AF row group". An AF row group includes a plurality of AF rows located inside the group. A row where an A+B image signal is read out of each unit pixel 100 is referred to as "normal row". A group of rows where an A+B image signal is read out of each unit pixel 100 is referred to as "normal row group". A normal row group includes a plurality of normal rows located inside the group. AF rows and normal rows are set in a suitable manner in the image pickup apparatus of this embodiment.

Figure 2:
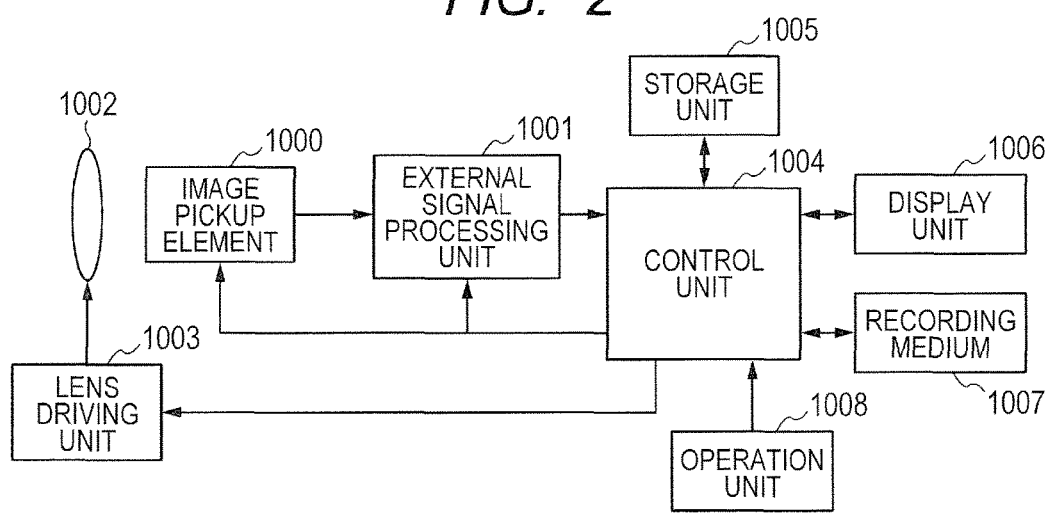
FIG. 2 is a block diagram for illustrating an image pickup apparatus according to a first embodiment of the present invention.

FIG. 2 is a block diagram for illustrating the image pickup apparatus (image pickup system) according to this embodiment. The photographic lens 1002 is configured to form an optical image of an object on the image pickup element (image pickup apparatus) 1000. A lens driving unit 1003 performs zoom control, focus control, diaphragm control, and the like on the photographic lens 1002. The image pickup element 1000 is configured to take in, as a signal, an image of an object that is formed by the photographic lens 1002. The unit pixels 100 each including the two photodiodes 101A and 101B are arranged into an array pattern in the image pickup element 1000. The image pickup element 1000 outputs A+B image signals, A image signals, and B image signals. An external signal processing unit 1001 is configured to make various corrections to signals output from the image pickup element 1000. A control unit (processing unit) 1004 is configured to perform various calculations and to handle the overall control of the image pickup apparatus (image pickup system) according to this embodiment. The control unit 1004 is also configured to perform focus detection operation that uses A image signals and B image signals. A storage unit 1005 is configured to store image data and the like temporarily. A display unit 1006 is configured to display various types of information, a photographed image, and the like. A recording medium 1007 is configured to record image data and the like, and is a detachable recording medium, e.g., a semiconductor memory. An operation unit 1008 includes a button, a dial, or the like to receive an input of a user's operation. In a case where the display unit 1006 is a touch panel, the operation unit 1008 includes the touch panel as well.

Figure 3:
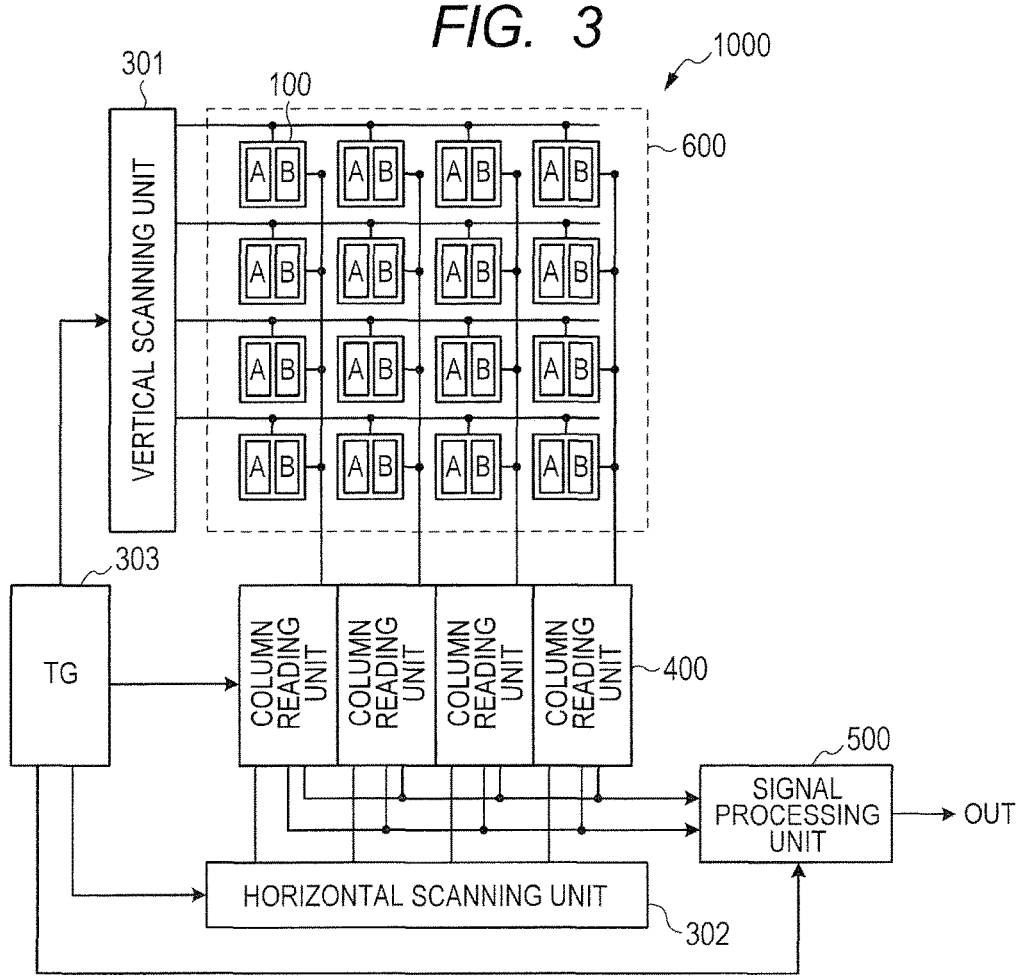
FIG. 3 is a block diagram for illustrating an image pickup element according to the first embodiment.

The configuration of the image pickup element 1000 is described next with reference to FIG. 3 to FIG. 5. FIG. 3 is a block diagram for illustrating the image pickup element 1000 according to this embodiment.

As illustrated in FIG. 3, the image pickup element 1000 includes a pixel array (pixel area) 600, column reading units 400, a vertical scanning unit 301, a horizontal scanning unit 302, a timing generating unit 303, and a signal processing unit 500.

The unit pixels 100 each including the two photodiodes 101A and 101B are arranged into a matrix pattern in the pixel array 600. While the pixel array 600 described here is an array of four by four unit pixels 100 for simplification, a large number of unit pixels 100 are actually arranged in the pixel array 600.

The vertical scanning unit (vertical scanning circuit) 301 is configured to select the unit pixels 100 arranged in the pixel array 600 one row at a time, and to output a drive signal to the unit pixels 100 of the selected row.

One column reading unit (column reading circuit) 400 is provided for each column. Each column reading unit 400 is configured to perform A/D conversion on signals output from the unit pixels 100, and to sequentially output, based on a horizontal scanning pulse signal output from the horizontal scanning unit 302, output signals to the signal processing unit 500.

The timing generating unit (timing generating circuit: TG) 303 is configured to output signals for separately controlling the column reading units 400, the vertical scanning unit 301, the horizontal scanning unit 302, the signal processing unit 500, and others.

The signal processing unit 500 is configured to execute correction processing (clamping processing) for signals output from the column reading units 400, and to output the processed signals to the outside of the image pickup element 1000. The signal processing unit 500 is also configured to execute correction processing, which is described later. An identification signal described later is output from, for example, the timing generating unit 303.

Figure 4:
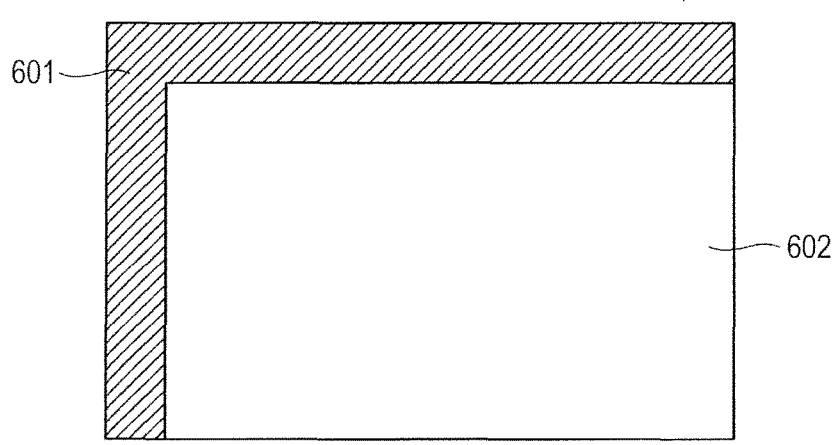
FIG. 4 is a plan view for illustrating the layout of a pixel array.

FIG. 4 is a plan view for illustrating the layout of the pixel array. As illustrated in FIG. 4, a part of the pixel array 600 is an optical black (OB) pixel area (reference pixel area) 601 in which optical black (OB) pixels (reference pixels) having optically shielded photodiodes 101A and 101B are arranged. The reference pixel area 601 is for obtaining a correction value (clamping value) that is used in the correction processing. The area of the pixel array 600 that remains after excluding the reference pixel area 601 is a light-receiving pixel area (open pixel area) 602 in which light-receiving pixels configured to receive an optical image of an object are arranged.

Figure 5:
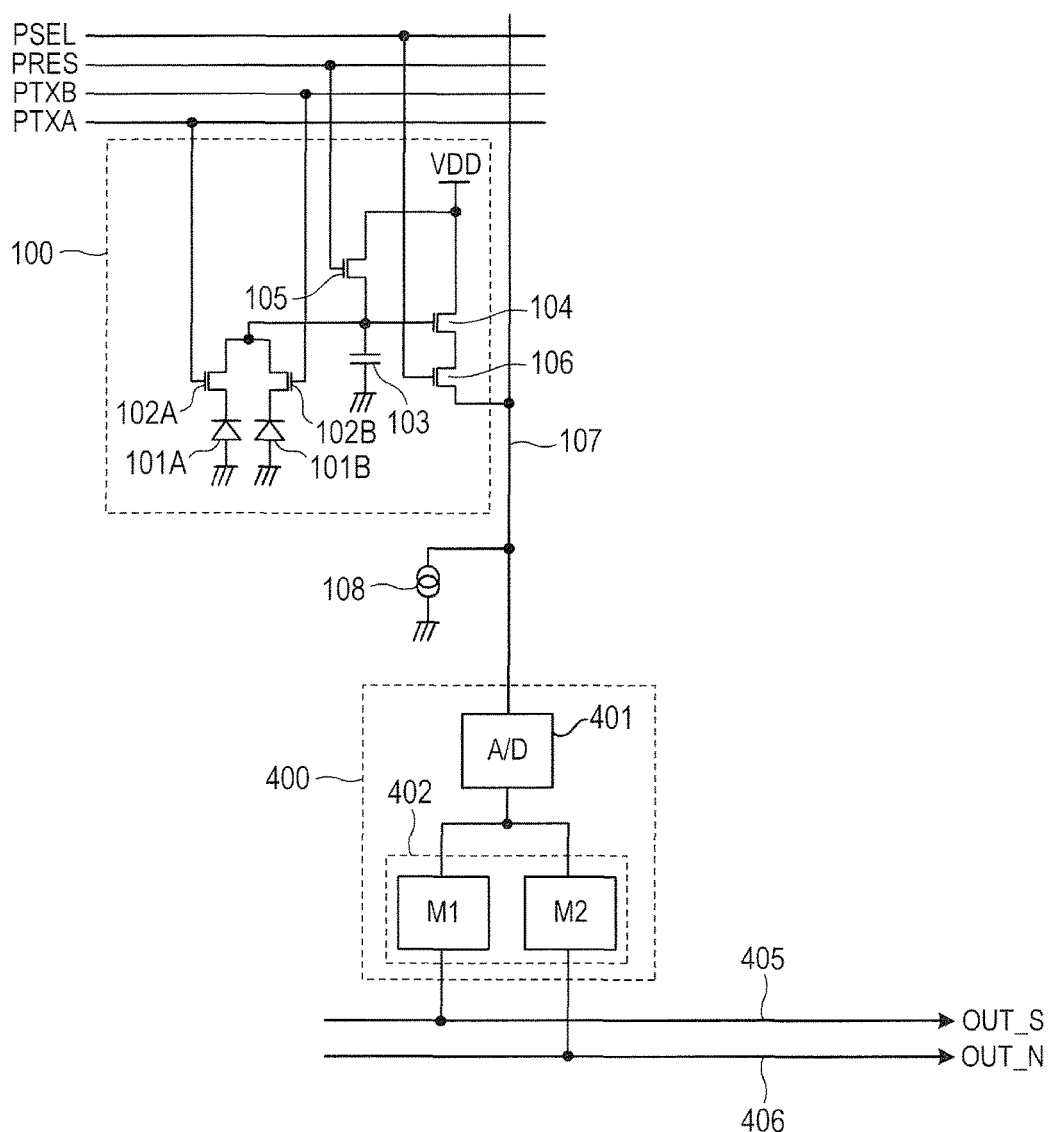
FIG. 5 is a diagram for illustrating a unit pixel and a column reading unit.

FIG. 5 is a diagram for illustrating one unit pixel 100 and one column reading unit 400 that are taken out of the plurality of unit pixels 100 and the plurality of column reading units 400 for the purpose of simplification.

Each unit pixel 100 includes the photodiodes 101A and 101B, transfer switches 102A and 102B, a floating diffusion node 103, an amplifying transistor 104, a reset switch 105, and a selection switch 106.

The photodiodes 101A and 101B are configured to receive light fluxes that have passed through the same microlens 111, and to generate electric charges (signal charges) in quantities determined by the amounts of received light. The transfer switches 102A and 102B are configured to respectively transfer electric charges generated in the photodiodes 101A and 101B to the floating diffusion node 103. The transfer switches 102A and 102B are controlled with transfer pulse signals PTXA and PTXB, respectively. The floating diffusion node 103 is configured to temporarily hold electric charges transferred from the photodiodes 101A and 101B, and also functions as a charge-voltage converter configured to convert the held charges into voltage signals. A level of voltage that is determined by the electric charges held in the floating diffusion node 103 is applied to a gate of the amplifying transistor 104. The amplifying transistor 104 is connected to a current source (current source transistor) 108 through a vertical output line 107, thereby serving as a source follower. A drain of the amplifying transistor 104 is connected to a reference potential VDD. The unit pixel 100 outputs, through the vertical output line (output signal line) 107, an output signal of the amplifying transistor 104 that has a magnitude determined by the electric potential of the gate of the amplifying transistor 104.

A drain of the reset switch 105 is connected to the reference potential VDD. The reset switch 105 is controlled with a reset pulse signal PRES to reset the electric potential of the floating diffusion node 103 to the reference potential VDD. The selection switch 106 is controlled with a vertical selection pulse signal PSEL to output an output signal of the amplifying transistor 104, namely, a pixel signal, to the vertical output line 107.

Each column reading unit (reading circuit) 400 includes an A/D converter (A/D conversion circuit) 401 and a memory unit (memory circuit) 402.

The A/D converter 401 is configured to convert an analog signal that is output through the vertical output line 107 into a digital signal. The A/D converter 401 includes, for example, a comparison unit (comparison circuit) and a counter (counter circuit), which are not illustrated. The comparison unit is configured to compare a ramp signal of which the voltage value changes with time and an input signal, and to output a signal to the counter at a time when the magnitude relation between the ramp signal and the input signal is reversed. The counter is configured to receive the signal from the comparison unit, and to hold a count value counted by the counter. The count value counted by the counter is held in the memory unit (memory circuit) 402 as a digital signal.

The memory unit 402 includes two memories M1 and M2 configured to hold digital signals. The memory M1 holds A+B image signals, A image signals, and B image signals. The memory M2 holds N signals, which are described later. Digital signals held in the memory M1 and digital signals held in the memory M2 are output to the signal processing unit (signal processing circuit) 500 via digital signal output lines 405 and 406, respectively.

An amplifier may be provided upstream of the A/D converter 401 in FIG. 5 so that A/D conversion by the A/D converter 401 is executed after an analog signal output via the vertical output line 107 is amplified.

Figure 6:
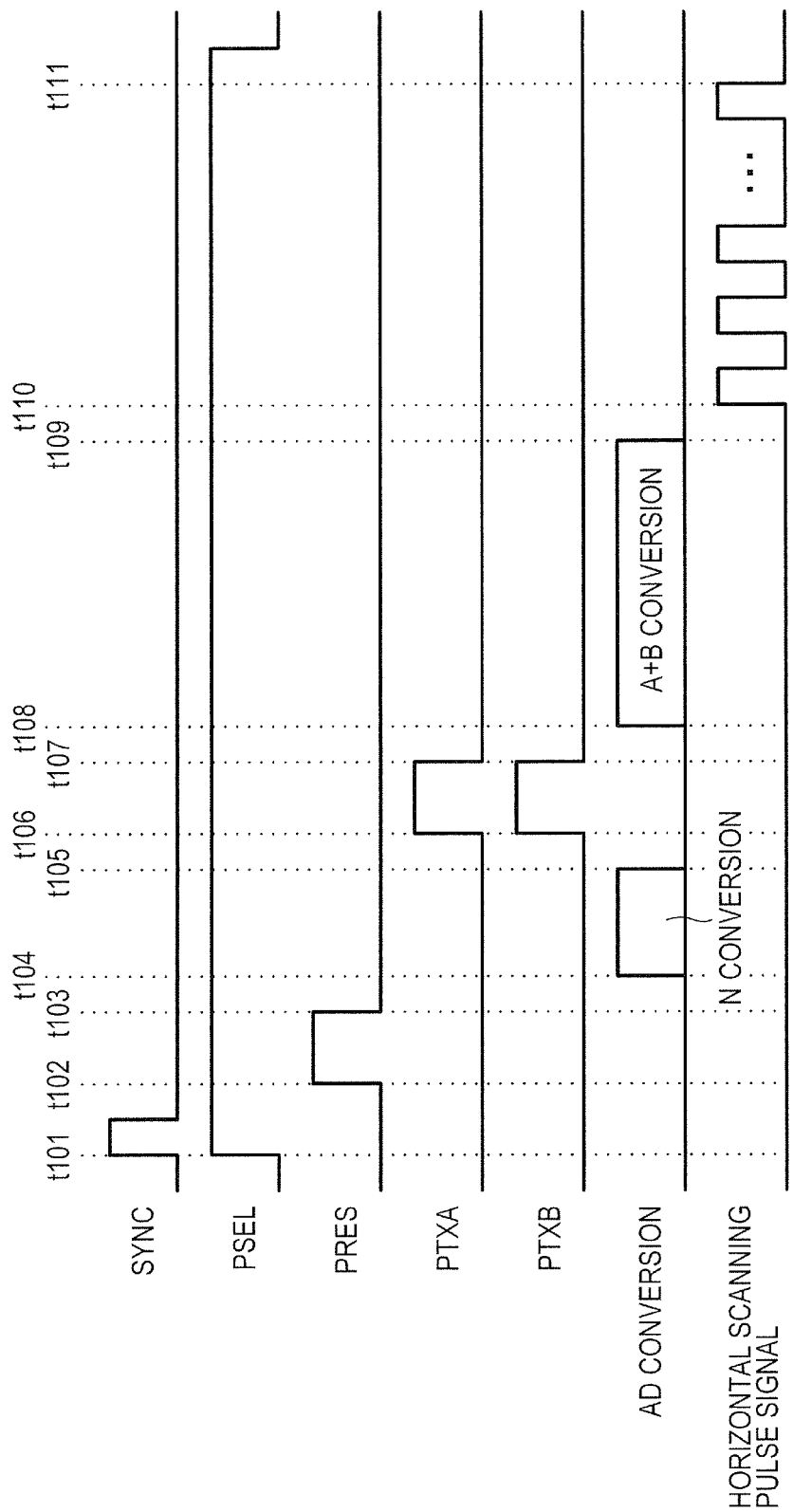
FIG. 6 is a timing chart for illustrating an operation of reading a normal row.
Figure 7:
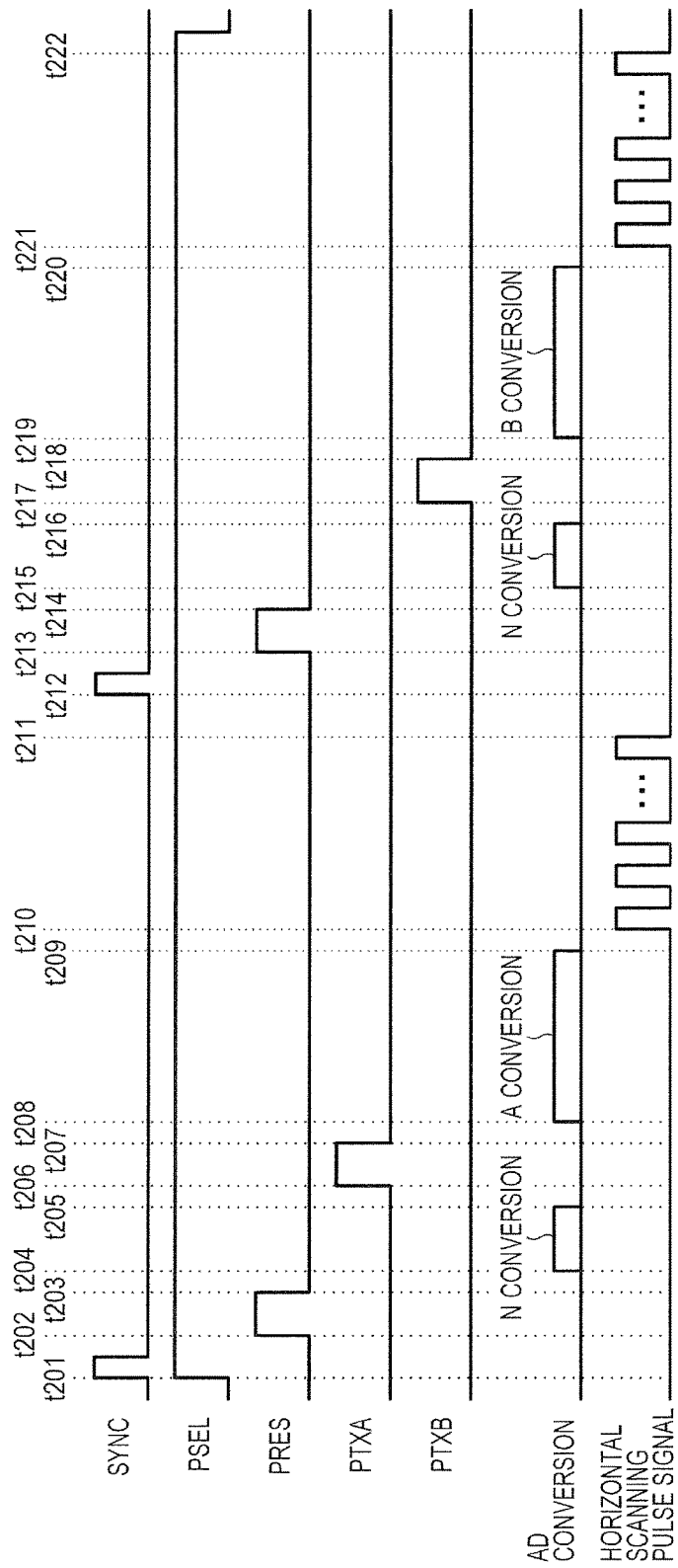
FIG. 7 is a timing chart for illustrating an operation of reading an AF row.

Reading operation of the image pickup element 1000 is described next with reference to FIG. 6 and FIG. 7. FIG. 6 is a time chart for illustrating the operation of reading a normal row. FIG. 7 is a time chart for illustrating the operation of reading an AF row. The reading operations illustrated in FIG. 6 and FIG. 7 are executed when the vertical scanning unit 301 selects one of the rows. The image pickup element 1000 uses various control signals and, when a control signal is at an H level, a switch that is associated with the control signal is switched on.

The operation of reading a normal row is described first with reference to FIG. 6.

At a time t101, a horizontal synchronization signal SYNC reaches the H level and the vertical selection pulse signal PSEL of the selected row reaches the H level as well. When the vertical selection pulse signal PSEL is at the H level, the selection switch 106 is switched on in each unit pixel 100 of the selected row, and the unit pixels 100 of the selected row are connected to the vertical output lines 107.

At a time t102, the reset pulse signal PRES reaches the H level, thereby switching the reset switch 105 on and setting the floating diffusion node 103 to a reset level in each relevant unit pixel 100.

At a time t103, the reset pulse signal PRES is set to an L level, thereby switching the reset switch 105 off. This cancels the resetting of the floating diffusion node 103. The selection switch 106 remains switched on, and an output signal having a magnitude that is determined by the gate potential of the amplifying transistor 104 at the time the resetting of the floating diffusion node 103 is canceled is therefore output to the relevant vertical output line 107. A pixel signal output from the unit pixel 100 at the time t103, namely, a reset level signal, is referred to as "noise signal (N signal)".

In a period from a time t104 to a time t105, the N signal output to the vertical output line 107 is converted into a digital signal by the A/D converter 401 of the relevant column reading unit 400. The digital signal obtained by the A/D converter 401 is held in the memory M2 of the memory unit 402. The operation executed in the period from the time t104 to the time t105, namely, the operation of converting an N signal into a digital signal, is referred to as "N conversion".

At a time t106, the transfer pulse signals PTXA and PTXB are set to the H level. This switches the transfer switches 102A and 102B of the unit pixel 100 on, and electric charges that have been generated in the photodiodes 101A and 101B by photoelectric conversion are transferred to the floating diffusion node 103. An A+B image signal, which is a pixel signal based on combined electric charges that are the electric charges generated in the photodiode 101A plus the electric charges generated in the photodiode 101B, is output to the vertical output line 107.

At a time t107, the transfer pulse signals PTXA and PTXB are set to the L level, thereby switching the transfer switches 102A and 102B off. The A+B image signal is kept output to the vertical output line 107 even after the transfer switches 102A and 102B are switched off.

In a period from a time t108 to a time t109, the A+B image signal output to the vertical output line 107 is converted into a digital signal by the A/D converter 401 of the column reading unit 400. The digital signal obtained by the A/D converter 401 is held in the memory M1 of the memory unit 402. The operation executed in the period from the time t108 to the time t109, namely, the operation of converting an A+B image signal into a digital signal, is referred to as "A+B conversion".

In a period from a time t110 to a time t111, the horizontal scanning unit 302 outputs a horizontal scanning pulse signal, and a digital signal held in the memory M1 of each column, which is an A+B image signal, and a digital signal held in the memory M2 of each column, which is an N signal, are output sequentially. The A+B image signal held in the memory M1 and the N signal held in the memory M2 are output to the signal processing unit 500 via the digital signal output lines 405 and 406, respectively (OUT_S, OUT_N). This manner of horizontal scanning is repeated until the last column is reached, whereby the reading of A+B image signals and N signals out of the row to be read is completed. The signal processing unit 500 executes processing of subtracting, from an A+B image signal, an N signal that is associated with the A+B image signal, thereby removing fixed-pattern noise.

Reading of the A+B image single out of a normal row is executed in this manner. A reading mode for normal row reading is a mode for reading a signal that is based on combined electric charges that are obtained by combining electric charges generated in each of the plurality of photodiodes 101A and 101B included in the unit pixel 100, namely, an A+B image signal. The reading mode for reading a signal based on combined electric charges that are obtained by combining electric charges generated in each of the plurality of photodiodes 101A and 101B included in the unit pixel 100 is referred to as "first mode".

The operation of reading an AF row is described next with reference to FIG. 7.

The operation in a period from a time t201 to a time t205 is the same as the operation in the period from the time t101 to the time t105 described above with reference to FIG. 6, and a description thereof is omitted.

At a time t206, the transfer pulse signal PTXA reaches the H level. This switches the transfer switch 102A of the unit pixel 100 on, and electric charges generated in the photodiode 101A by photoelectric conversion are transferred to the floating diffusion node 103. An A image signal, which is a pixel signal having a magnitude that is determined by the amount of electric charges generated in the photodiode 101A, is output to the vertical output line 107.

At a time t207, the transfer pulse signal PTXA is set to the L level, thereby switching the transfer switch 102A of the unit pixel 100 off. The A image signal is kept output to the vertical output line 107 even after the transfer switch 102A is switched off.

In a period from a time t208 to a time t209, the A image signal output to the vertical output line 107 is converted into a digital signal by the A/D converter 401 of the column reading unit 400. The digital signal obtained by the A/D converter 401 is held in the memory M1 of the memory unit 402. The operation executed in the period from the time t208 to the time t209, namely, the operation of converting an A image signal into a digital signal, is referred to as "A conversion".

In a period from a time t210 to a time t211, the horizontal scanning unit 302 outputs a horizontal scanning pulse signal, and a digital signal held in the memory M1 of each column, which is an A image signal, and a digital signal held in the memory M2 of each column, which is an N signal associated with the A image signal, are output sequentially. The A image signal held in the memory M1 and the N signal held in the memory M2 are output to the signal processing unit 500 via the digital signal output lines 405 and 406, respectively. This manner of horizontal scanning is repeated until the last column is reached, whereby the reading of A image signals and N signals out of the row to be read is completed.

At a time t212, the horizontal synchronization signal SYNC reaches the H level again while the vertical selection pulse signal PSEL remains at the H level, which means that the same row is still selected.

At a time t213, the reset pulse signal PRES reaches the H level and the reset switch 105 of the unit pixel 100 is switched on, thereby resetting the electric potential of the floating diffusion node 103.

At a time t214, the reset pulse signal PRES is set to the L level, thereby switching the reset switch 105 off. This causes the unit pixel 100 to output an N signal that is a reset level signal to the vertical output line 107.

In a period from a time t215 to a time t216, the N signal output to the vertical output line 107 is converted into a digital signal by the A/D converter 401 of the column reading unit 400. The digital signal obtained by the A/D converter 401 is held in the memory M2 of the memory unit 402.

At a time t217, the transfer pulse signal PTXB is set to the H level. This switches the transfer switch 102B of the unit pixel 100 on, and electric charges generated in the photodiode 101B by photoelectric conversion are transferred to the floating diffusion node 103. A B image signal, which is a pixel signal having a magnitude that is determined by the amount of electric charges generated in the photodiode 101B, is output to the vertical output line 107.

At a time t218, the transfer pulse signal PTXB is set to the L level, thereby switching the transfer switch 102B off. The B image signal is kept output to the vertical output line 107 even after the transfer switch 102B is switched off.

In a period from a time t219 to a time t220, the B image signal output to the vertical output line 107 is converted into a digital signal by the A/D converter 401 of the column reading unit 400. The digital signal obtained by the A/D converter 401 is held in the memory M1 of the memory unit 402. The operation executed in the period from the time t219 to the time t220, namely, the operation of converting a B image signal into a digital signal, is referred to as "B conversion".

In a period from a time t221 to a time t222, the horizontal scanning unit 302 outputs a horizontal scanning pulse signal, and a digital signal held in the memory M1 of each column, which is a B image signal, and a digital signal held in the memory M2 of each column, which is an N signal associated with the B image signal, are output sequentially. The B image signal held in the memory M1 and the N signal held in the memory M2 are output to the signal processing unit 500 via the digital signal output lines 405 and 406, respectively. This manner of horizontal scanning is repeated until the last column is reached, whereby the reading of B image signals and N signals out of the row to be read is completed.

In this manner, an A image signal and an N signal associated with the A image signal are output from an AF row, and a B image signal and an N signal associated with the B image signal are further output from the AF row. The signal processing unit 500 executes processing of subtracting, from an A image signal, an N signal that is associated with the A image signal, and also executes processing of subtracting, from a B image signal, an N signal that is associated with the B image signal, thereby removing fixed-pattern noise.

Reading A image signals and B image signals out of an AF row is executed in this manner. A reading mode for AF-row reading is a mode for reading a signal that is based on electric charges generated in the photodiode 101A and a signal that is based on electric charges generated in the photodiode 101B, namely, an A image signal and a B image signal. The reading mode for reading a signal that is based on electric charges generated in one of the plurality of photodiodes 101A and 101B included in the unit pixel 100 is referred to as "second mode".

The timing generating unit 303 outputs control signals at timing illustrated in FIG. 6 when it is a normal row to be read, and outputs control signals at timing illustrated in FIG. 7 when it is an AF row to be read. This means that the timing generating unit 303 switches the mode of outputting control signals suitably from row to row. In other words, the timing generating unit 303 switches the reading mode suitably from row to row. A suitable signal selected from an A+B image signal, an A image signal, and a B image signal which varies from row to row can thus be read out of the row. This manner of reading takes a shorter time than when an A image signal and a B image signal are read out of every unit pixel 100.

In addition, an A+B image signal that is an image pickup signal can be obtained by combining an A image signal and a B image signal in the signal processing unit 500 or other components.

FIG. 8A is a diagram for illustrating an example of output signals that are output from the respective rows. As illustrated in FIG. 8A, an A+B image signal is output from a normal row 801, an A image signal is output from an AF row 802, and a B image signal is output from an AF row 803.

FIG. 8B is a diagram for illustrating an example of dark current amounts in the respective rows. The rows in FIG. 8B correspond to the rows in FIG. 8A. As illustrated in FIG. 8B, a dark current amount 805 of the A image signal output from the AF row 802 and a dark current amount 806 of the B image signal output from the AF row 803 are each substantially a half of a dark current amount 804 of the A+B image signal output from the normal row 801. The AF row 802 of FIG. 8A outputs a B image signal in addition to the A image signal. Similarly, the AF row 803 of FIG. 8A outputs an A image signal in addition to the B image signal.

Figure 9:
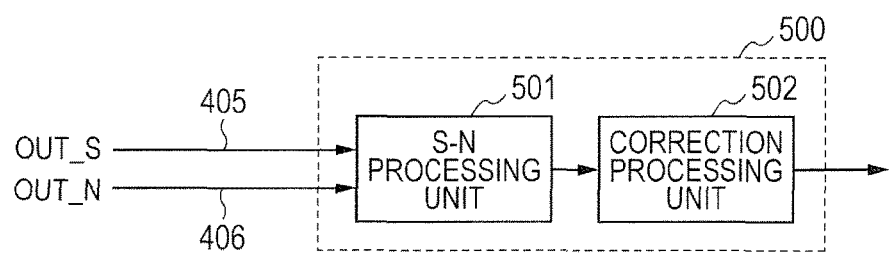
FIG. 9 is a block diagram for illustrating a signal processing unit.

Signal processing executed in the signal processing unit 500 is described next with reference to FIG. 9. FIG. 9 is a block diagram for illustrating the signal processing unit 500. The signal processing unit 500 includes an S-N processing unit 501 and the correction processing unit 502 as illustrated in FIG. 9.

A signal from a row which may be an A+B image signal, an A image signal, or a B image signal, depending on the type of the row, is input to the S-N processing unit 501 via the digital signal output line 405. An N signal that is associated with the A+B image signal, A image signal, or B image signal input via the digital signal output line 405 is also input to the S-N processing unit 501 via the digital signal output line 406. When it is an A+B image signal that is input to the S-N processing unit 501 via the digital signal output line 405, the S-N processing unit 501 subtracts from the input A+B image signal an N signal that is associated with the input A+B image signal. When it is an A image signal that is input to the S-N processing unit 501 via the digital signal output line 405, the S-N processing unit 501 subtracts from the input A image signal an N signal that is associated with the input A image signal. When it is a B image signal that is input to the S-N processing unit 501 via the digital signal output line 405, the S-N processing unit 501 subtracts from the input B image signal an N signal that is associated with the input B image signal. This may remove fixed-pattern noise. The A+B image signal from which the N signal has been subtracted, the A image signal from which the N signal has been subtracted, or the B image signal from which the N signal has been subtracted is output to the correction processing unit 502.

The correction processing unit 502 is configured to execute correction processing in which the black level is corrected to a reference level by using output signals from the unit pixels 100 that are located in the reference pixel area 601.

Figure 10:
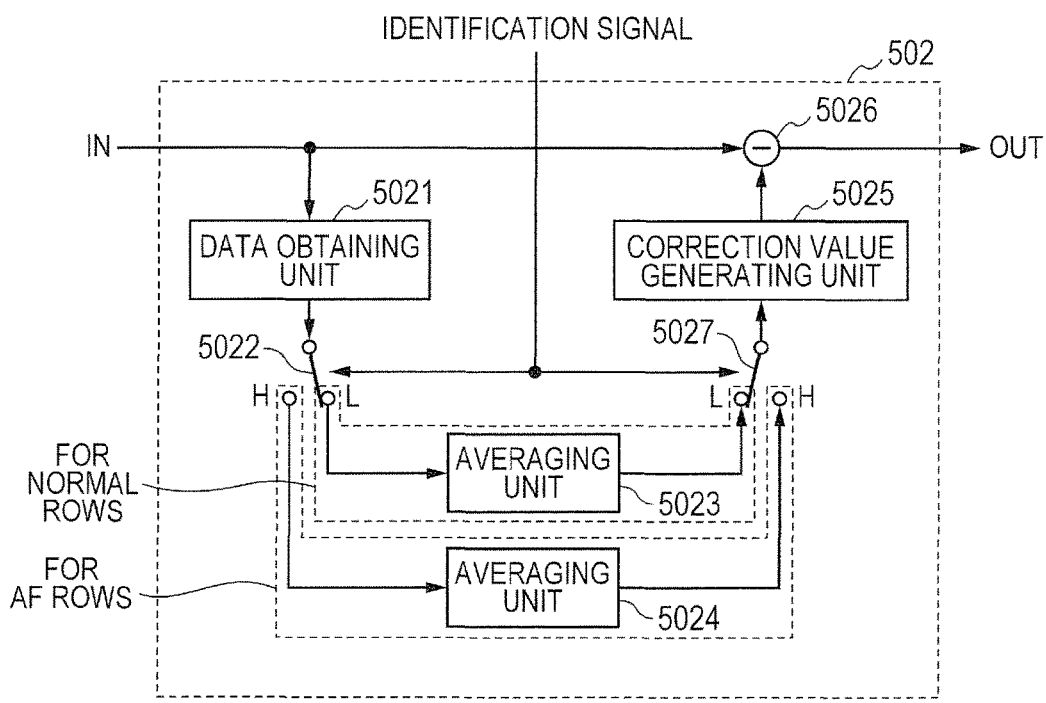
FIG. 10 is a block diagram for illustrating a correction processing unit of the image pickup apparatus according to the first embodiment.
Figure 11:
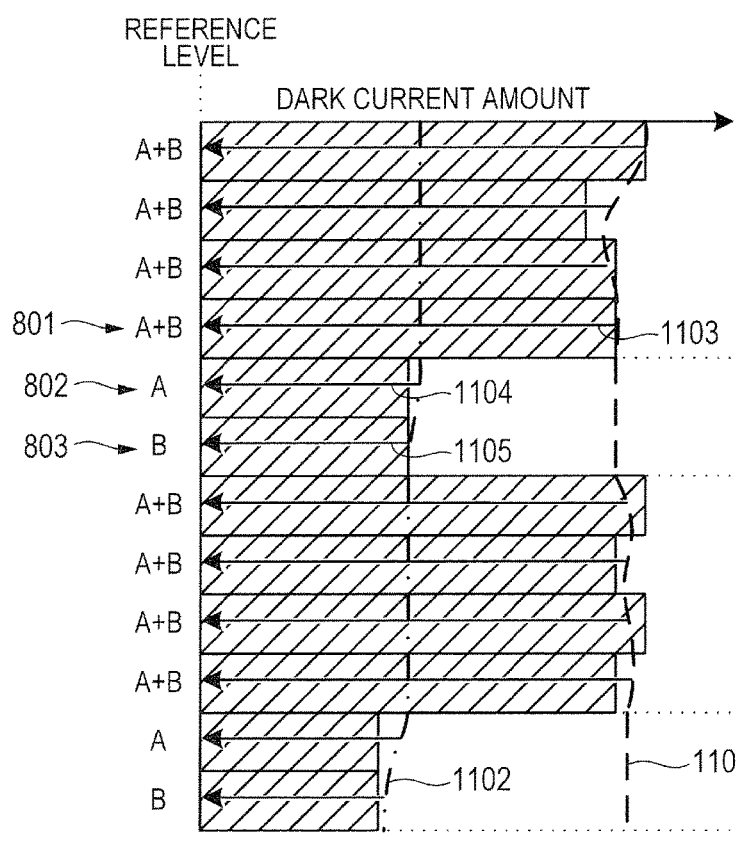
FIGS. 11A and 11B are conceptual diagrams for illustrating processing that is executed in the correction processing unit of the image pickup apparatus according to the first embodiment.

The correction processing unit 502 is described with reference to FIG. 10. FIG. 10 is a block diagram for illustrating the correction processing unit of the image pickup apparatus according to this embodiment.

A data obtaining unit (data obtaining circuit) 5021 is configured to selectively obtain, from among input signals that are input to the correction processing unit 502, pixel signals read out of the unit pixels 100 that are located in the reference pixel area 601 (see FIG. 4) of the pixel array 600. The data obtaining unit 5021 outputs data to a processing unit (processing circuit) that is downstream of the data obtaining unit 5021, namely, a processing unit configured to update a correction value. A switching unit (switching circuit) 5022 is configured to selectively input a pixel signal obtained by the data obtaining unit 5021 to one of a normal-row averaging unit (averaging circuit) 5023 and an AF-row averaging unit (averaging processing circuit) 5024. The switching unit 5022 makes a switch based on an identification signal (reading mode identification pulse) that indicates whether the pixel signal input to the correction processing unit 502 has been read out of a normal row or an AF row. The identification signal that is at the L level indicates that the pixel signal input to the correction processing unit 502 has been read out of a normal row. The switching unit 5022 accordingly makes a switch that inputs the data obtained by the data obtaining unit 5021, namely, the pixel signal to the normal-row averaging unit 5023 when the data identification signal is at the L level. On the other hand, the identification signal that is at the H level indicates that the pixel signal input to the correction processing unit 502 has been output from an AF row. The switching unit 5022 accordingly makes a switch that inputs the data obtained by the data obtaining unit 5021, namely, the pixel signal to the AF-row averaging unit 5024 when the identification signal is at the H level.

Pixel signals output from the unit pixels 100 in a normal row out of the unit pixels 100 that are located in the reference pixel area 601 are input to the normal-row averaging unit 5023. The normal-row averaging unit 5023 is configured to perform averaging processing on pixel signals input to the normal-row averaging unit 5023, and to calculate an average black level. The average black level can be made to loosely follow output level changes in the row direction of the pixel array 600 by executing the averaging processing with the use of a given time constant. The calculated average black level is input to a correction value generating unit (correction value generating circuit) 5025 via a switching unit (switching circuit) 5027. When the identification signal is at the L level, the switching unit 5027 makes a switch that inputs an output from the normal-row averaging unit 5023 to the correction value generating unit 5025. On the other hand, when the identification signal is at the H level, the switching unit 5027 makes a switch that inputs an output from the AF-row averaging unit 5024 to the correction value generating unit 5025. The correction value generating unit 5025 is configured to generate a correction value for correcting an average black level to a reference level based on a difference between the average black level and the reference level. The correction value is used to correct a signal read out of the unit pixel 100 that is located in the light-receiving pixel area 602.

Pixel signals output from the unit pixels 100 in an AF row out of the unit pixels 100 that are located in the reference pixel area 601 are input to the AF-row averaging unit 5024 via the switching unit 5022. The AF-row averaging unit 5024 calculates an average black level through processing similar to the averaging processing that is executed in the normal-row averaging unit 5023. The average black level calculated in the AF-row averaging unit 5024 is output to the correction value generating unit 5025 via the switching unit 5027.

A correction unit (arithmetic unit, subtraction unit, subtraction circuit) 5026 is configured to correct a black level to a reference level by subtracting a correction value generated in the correction value generating unit 5025 from a pixel signal output from the unit pixel 100 that is located in the light-receiving pixel area 602. A correction value based on an average black level that is calculated by the normal-row averaging unit 5023 is subtracted from a pixel signal that has been output from a normal row. The correction value subtracted from a pixel signal that has been output from an AF row, on the other hand, is based on an average black level that is calculated by the AF-row averaging unit 5024. The correction unit 5026 thus uses a correction value generated by the correction value generating unit 5025 to correct a signal read out of the unit pixel 100 that is located in the light-receiving pixel area 602.

In this manner, the average black level of a normal row is calculated by the normal-row averaging unit 5023 and the average black level of an AF row is calculated by the AF-row averaging unit 5024. The correction value generating unit 5025 generates a correction value for the normal row based on the average black level of the normal row, and generates a correction value for the AF row based on the average black level of the AF row. In other words, the correction value generating unit 5025 generates a correction value based on an average black level (average value) that is obtained by averaging signals sequentially read out of the unit pixels 100 that are located in the reference pixel area 601, in a manner suited to the reading mode of the signals. The black level can therefore be corrected properly despite a large difference between the dark current of a normal row and the dark current of an AF row.

FIG. 11A is a diagram for illustrating an example of dark current amounts in the respective rows, average black levels 1101 and 1102, and correction values 1103 to 1105. The rows in FIG. 11A correspond to the rows in FIG. 8A and FIG. 8B. FIG. 11B is a diagram for illustrating an example of identification signals that are associated with the respective rows in FIG. 11A.

For example, in the case where signals input to the correction processing unit 502 are pixel signals output from the unit pixels 100 of the normal row 801, the identification signal is at the L level and the average black level 1101 is calculated by the normal-row averaging unit 5023. Specifically, the normal-row averaging unit 5023 calculates an average value (average black level) of pixel signals sequentially read out of the unit pixels 100 in the normal row 801, out of the unit pixels 100 that are located in the reference pixel area 601. The average black level 1101 calculated by the normal-row averaging unit 5023 is indicated by the broken line in FIG. 11A. The correction value generating unit 5025 generates the correction value 1103 based on a reference level and on the average black level 1101 calculated by the normal-row averaging unit 5023. The correction value 1103 is indicated by the arrow in FIG. 11A.

On the other hand, in the case where signals input to the correction processing unit 502 are pixel signals read out of the unit pixels 100 of the AF row 802 or 803, the identification signal is at the H level and an average black level is calculated by the AF-row averaging unit 5024. Specifically, the AF-row averaging unit 5024 calculates an average value (average black level) of pixel signals sequentially read out of the unit pixels 100 in the AF row, out of the unit pixels 100 that are located in the reference pixel area 601. The average black level 1102 calculated by the AF-row averaging unit 5024 is indicated by the dot-dash line in FIG. 11A. The correction value generating unit 5025 generates the correction values 1104 and 1105 based on the reference level and on the average black level that is calculated by the AF-row averaging unit 5024. The correction values 1104 and 1105 are indicated by the arrows in FIG. 11A.

The average black level 1101 for the normal row 801 is updated only when signals input to the correction processing unit 502 are pixel signals read out of the unit pixels 100 in the normal row 801. The average black level 1102 for the AF rows 802 and 803, on the other hand, is updated only when signals input to the correction processing unit 502 are pixel signals read out of the unit pixels 100 in the AF row 802 or 803. An appropriate correction value can therefore be generated without being affected by a difference between the dark current amount of the normal row 801 and the dark current amount of the AF row 802 or 803, and favorable correction processing is accomplished.

Figure 12:
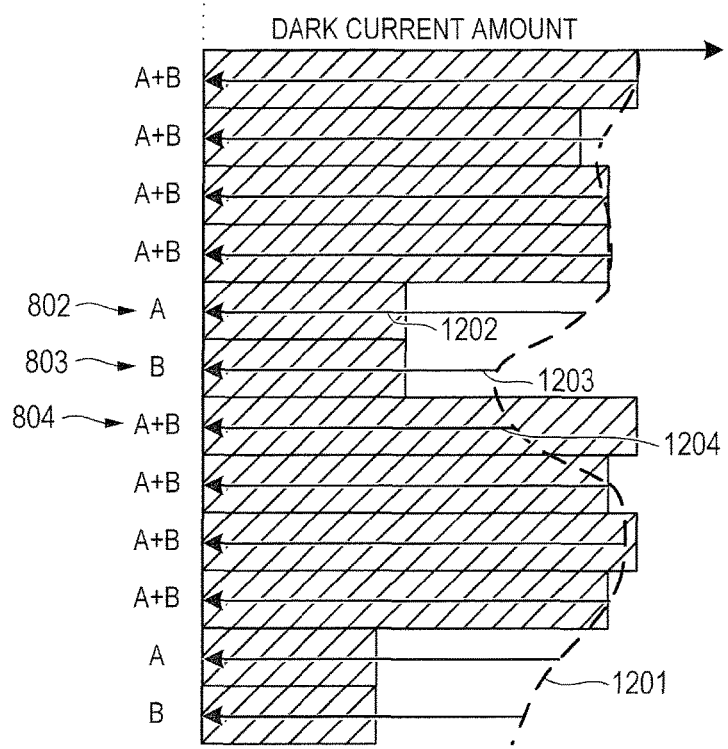
FIG. 12 is a conceptual diagram for illustrating the operation of a correction processing unit according to a reference example.

FIG. 12 is a diagram for illustrating an example of dark current amounts in the respective rows, an average black level 1201, and correction values 1202 to 1204 in the case of a comparative example. In the example of FIG. 12, correction processing is executed by a correction processing unit that is not provided with the switching units 5022 and 5027. When the average black level is always calculated by the same averaging unit, instead of making a switch between different averaging units by switching units, the difference in dark current amount between a normal row and an AF row causes the average black level 1201 to fluctuate greatly as illustrated in FIG. 12. This results in over-correction when, for example, the correction values 1202 and 1203 are used to correct the AF rows 802 and 803, and in under-correction when, for example, the correction value 1204 is used to correct the normal row 801.

In contrast, this embodiment includes an averaging unit for normal rows and an averaging unit for AF rows. The normal-row averaging unit 5023 calculates an average for pixel signals output from the unit pixels 100 in a normal row, out of the unit pixels 100 that are located in the reference pixel area 601. The AF-row averaging unit 5024 calculates an average for pixel signals output from the unit pixels 100 in an AF row, out of the unit pixels 100 that are located in the reference pixel area 601. The correction value generating unit 5025 then generates a correction value favorable for the normal row based on the average value calculated by the normal-row averaging unit 5023. The correction value generating unit 5025 also generates a correction value favorable for the AF row based on the average value calculated by the AF-row averaging unit 5024. The black level of an A+B image signal read out of a normal row can thus be corrected favorably with the use of a correction value favorable for the normal row. The black levels of an A image signal and a B image signal that are read out of an AF row can also be corrected favorably with the use of a correction value favorable for the AF row. According to this embodiment, where the black level can be corrected favorably in both normal rows and AF rows, an image pickup apparatus capable of obtaining a favorable image is provided.

Second Embodiment

An image pickup apparatus according to a second embodiment of the present invention and an image pickup system that uses the image pickup apparatus are described with reference to FIG. 13 to FIG. 14B. Components of the second embodiment that are the same as those in the image pickup apparatus and image pickup system according to the first embodiment which are illustrated in FIG. 1 to FIG. 12 are denoted by the same symbols, and descriptions on the components are omitted or simplified here.

The first embodiment is provided with the normal-row averaging unit 5023 and the AF-row averaging unit 5024, which are separate components. In contrast, a single averaging unit 1304 is provided in this embodiment. The configuration of the second embodiment other than a correction processing unit 1300 is the same as in the first embodiment, and a description thereof is omitted here.

Figure 13:
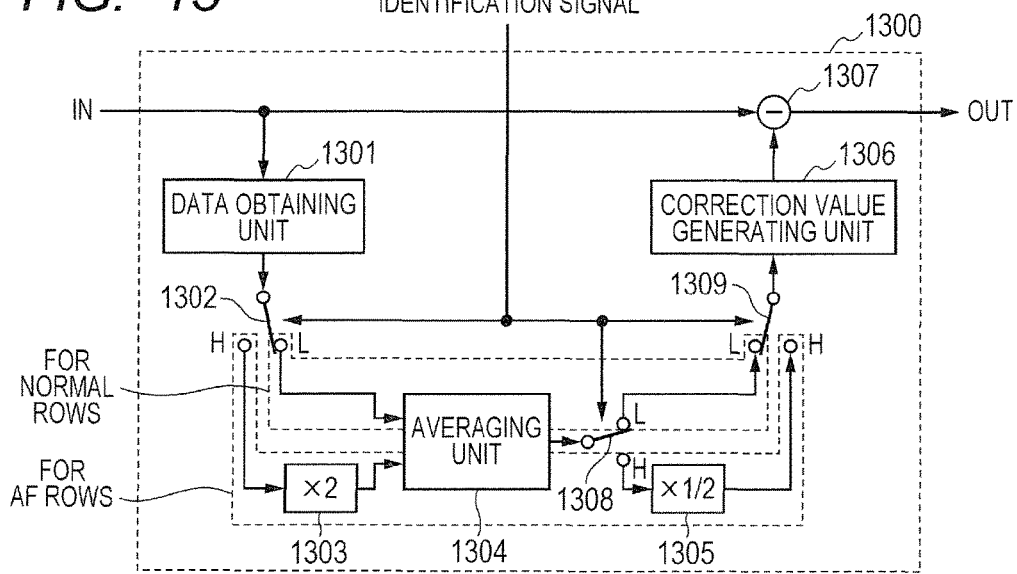
FIG. 13 is a block diagram for illustrating a correction processing unit of an image pickup apparatus according to a second embodiment of the present invention.

FIG. 13 is a block diagram for illustrating the correction processing unit 1300 of the image pickup apparatus according to this embodiment.

A data obtaining unit 1301 is configured to selectively obtain, from among input signals that are input to the correction processing unit 1300, pixel signals read out of the unit pixels 100 that are located in the reference pixel area 601. A switching unit 1302 is configured to make a switch based on an identification signal that indicates whether the pixel signal input to the correction processing unit 1300 has been read out of a normal row or an AF row. Pixel signals read out of the unit pixels 100 in a normal row out of the unit pixels 100 that are located in the reference pixel area 601 are input to the averaging unit 1304, where the average black level of the input pixel signals is calculated. Pixel signals read out of the unit pixels 100 in an AF row out of the unit pixels 100 that are located in the reference pixel area 601, on the other hand, undergo gain multiplication by a gain multiplication unit 1303 in which the pixel signals are multiplied by a gain larger than 1, more specifically, a doubling gain. The pixel signals multiplied by the gain are then input to the averaging unit 1304. The gain multiplication unit 1303 multiplies pixel signals of an AF row by a doubling gain because the dark current amount of an AF row is about a half of the dark current amount of a normal row. With the dark current adjusted by the gain multiplication unit 1303, pixel signals of a normal row and pixel signals of an AF row can share the averaging unit 1304 despite a large difference between the dark current of a normal row and the dark current of an AF row.

In the case where the signals input to the correction processing unit 1300 are pixel signals read out of a normal row, the average black level calculated by the averaging unit 1304 is input as it is to a correction value generating unit 1306 via switching units 1308 and 1309. The correction value generating unit 1306 is configured to generate a correction value for correcting an average black level to a reference level based on a difference between the average black level and the reference level. A correction value for a normal row is generated in this manner.

In the case where the signals input to the correction processing unit 1300 are pixel signals read out of an AF row, on the other hand, a gain multiplication unit 1305 multiplies the average black level calculated by the averaging unit 1304 by a gain smaller than 1, more specifically, a halving gain. The average black level multiplied by the halving gain by the gain multiplication unit 1305 is input to the correction value generating unit 1306. The correction value generating unit 1306 generates a correction value for correcting the average black level multiplied by the halving gain to the reference level, based on a difference between the multiplied average black level and the reference level. A correction value for an AF row is generated in this manner.

A correction unit 1307 is configured to correct a black level to a reference level by subtracting a correction value generated by the correction value generating unit 1306, from a pixel signal output from the unit pixel 100 of the light-receiving pixel area 602.

The black level can thus be corrected properly in this embodiment as well, despite a large difference between the dark current of a normal row and the dark current of an AF row.

FIG. 14A is a diagram for illustrating an example of dark current amounts in the respective rows, an average black level 1401, and correction values 1402 to 1404. FIG. 14B is a diagram for illustrating an example of identification signals.

For example, when signals input to the correction processing unit 1300 are pixel signals read out of the unit pixels 100 in the normal row 801, the identification signal is at the L level, and the average black level 1401 is calculated by using a pixel signal that has been obtained by the data obtaining unit 1301 as it is. The average black level 1401 is indicated by the broken line in FIG. 14A. The correction value 1402 is then generated based on the average black level 1401. The correction value 1402 is indicated by the arrow in FIG. 14A.

When signals input to the correction processing unit 1300 are pixel signals read out of the unit pixels 100 in the AF row 802 or 803, the identification signal is at the H level. The gain multiplication unit 1303 multiplies a pixel signal obtained by the data obtaining unit 1301 by a doubling gain, to thereby update the average black level 1401. The average black level calculated by the averaging unit 1304 is multiplied by a halving gain by the gain multiplication unit 1305. The average black level multiplied by the halving gain is output to the correction value generating unit 1306. In this manner, an appropriate correction value can be generated without being affected by the difference in dark current amount between a normal row and an AF row.

The black level can thus be corrected properly in this embodiment as well despite a large difference between the dark current of a normal row and the dark current of an AF row.

Third Embodiment

An image pickup apparatus according to a third embodiment of the present invention and an image pickup system that uses the image pickup apparatus are described with reference to FIG. 15 to FIG. 16B. Components of the third embodiment that are the same as those in the image pickup apparatus and image pickup system according to the first or second embodiment which are illustrated in FIG. 1 to FIG. 14B are denoted by the same symbols, and descriptions on the components are omitted or simplified here.

The image pickup apparatus according to this embodiment includes an averaging unit 1503, which executes averaging based only on pixel signals read out of the unit pixels 100 of a normal row that are in the reference pixel area 601. The configuration of the third embodiment other than a correction processing unit 1500 is the same as that of the image pickup apparatus according to the first embodiment or the second embodiment, and a description thereof is omitted here.

FIG. 15 is a block diagram for illustrating the correction processing unit 1500 of the image pickup apparatus according to this embodiment. A data obtaining unit 1501 is configured to selectively obtain, from among input signals that are input to the correction processing unit 1500, pixel signals read out of the unit pixels 100 of a normal row that are in the reference pixel area 601. A switching unit 1502 is configured to input pixel signals obtained by the data obtaining unit 1501 to the averaging unit 1503 only when the signals input to the correction processing unit 1500 are pixel signals read out of the unit pixels 100 in a normal row. Whether a pixel signal input to the correction processing unit 1500 has been read out of a normal row or an AF row is determined based on an identification signal as in the image pickup apparatus according to the first embodiment or the second embodiment. The averaging unit 1503 performs averaging processing on the input pixel signals, and calculates an average black level.

In the case where the signals input to the correction processing unit 1500 are pixel signals read out of the unit pixels 100 in a normal row, the average black level calculated by the averaging unit 1503 is output as it is to a correction value generating unit 1505 via switching units 1507 and 1508. The correction value generating unit 1505 is configured to generate a correction value for correcting an average black level to a reference level based on a difference between the average black level and the reference level.

In the case where the signals input to the correction processing unit 1500 are pixel signals read out of the unit pixels 100 in an AF row, on the other hand, the average black level calculated by the averaging unit 1503 is multiplied by a gain multiplication unit 1504 by a gain smaller than 1, more specifically, a halving gain. The average black level multiplied by the halving gain is output to the correction value generating unit 1505. In this manner, a correction value suitable for the correction of a pixel signal read out of the unit pixel 100 in an AF row is generated based on an average black level that is calculated based on pixel signals read out of the unit pixels 100 in a normal row.

The average black level is thus not updated in the case where signals read by the data obtaining unit 1501 are pixel signals that have been read out of the unit pixels 100 in an AF row. However, the average black level is made to loosely follow output level changes in the row direction of the pixel array 600 in the correction processing. Therefore, discrete provision of AF rows can reduce adverse effects due to not updating the average black level when signals read by the data obtaining unit 1501 are pixel signals read out of the unit pixels 100 in an AF row. Satisfactorily favorable correction processing can be executed as a result.

A correction unit 1506 is configured to subtract a correction value generated by the correction value generating unit 1505 from a pixel signal read out of the unit pixel 100 that is located in the light-receiving pixel area 602. Correction processing in which a black level is corrected to a reference level is executed in this manner.

The black level can thus be corrected properly in this embodiment as well, despite a large difference between the dark current of a normal row and the dark current of an AF row.

Figure 16A:
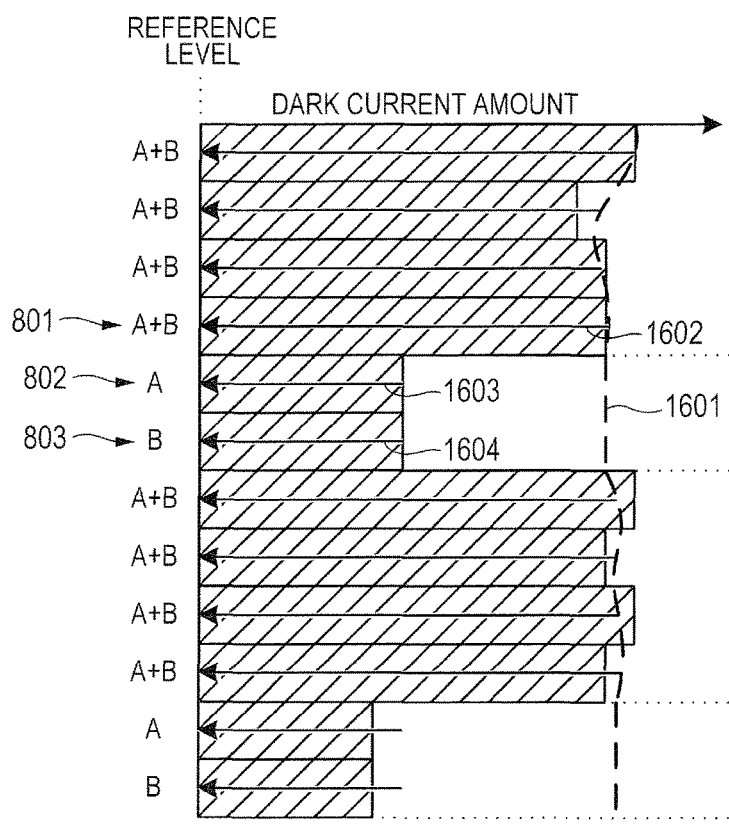
FIGS. 16A and 16B are conceptual diagrams for illustrating processing that is executed in the correction processing unit of the image pickup apparatus according to the third embodiment.
Figure 16B:
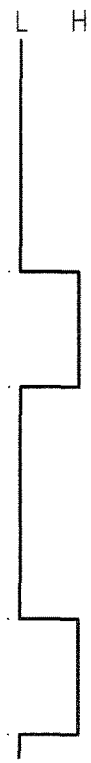

FIG. 16A is a diagram for illustrating an example of dark current amounts in the respective rows, an average black level 1601, and correction values 1602 to 1604. FIG. 16B is a diagram for illustrating an example of identification signals.

For example, in the case where signals input to the correction processing unit 1500 are pixel signals output from the unit pixels 100 in the normal row 801, the identification signal is at the L level. The averaging unit 1503 in this case calculates the average black level 1601 based on the pixel signals obtained by the data obtaining unit 1501. The average black level 1601 is indicated by the broken line in FIG. 16A. The correction value generating unit 1505 generates the correction value 1602 based on the average black level calculated by the averaging unit 1503.

On the other hand, in the case where signals input to the correction processing unit 1500 are pixel signals output from the unit pixels 100 in the AF row 802 or 803, the identification signal is at the H level. The averaging unit 1503 in this case does not update the average black level 1601. The gain multiplication unit 1504 multiplies the average black level by a halving gain, and the average black level multiplied by the halving gain is output to the correction value generating unit 1505. The correction value generating unit 1505 generates the correction values 1603 and 1604 based on the average black level multiplied by the halving gain. The correction values 1603 and 1604 are indicated by the arrows in FIG. 16A. In this manner, the black level can be corrected properly in this embodiment as well despite a large difference between the dark current of a normal row and the dark current of an AF row.

Fourth Embodiment

An image pickup apparatus according to a fourth embodiment of the present invention and an image pickup system that uses the image pickup apparatus are described with reference to FIG. 17 to FIG. 18C. Components of the fourth embodiment that are the same as those in the image pickup apparatus and image pickup system according to the first to third embodiments which are illustrated in FIG. 1 to FIG. 16B are denoted by the same symbols, and descriptions on the components are omitted or simplified here.

The image pickup apparatus according to this embodiment is a variation of the image pickup apparatus according to any one of the first embodiment to the third embodiment in which A image signals and A+B image signals are output from the unit pixels 100 of an AF row.

FIG. 17 is a timing chart for illustrating reading operation in this embodiment. The reading operation illustrated in FIG. 17 is the operation of reading an AF row.

The operation in a period from a time t301 to a time t312 is the same as the operation that is executed in the period from the time t201 to the time t212 by the image pickup apparatus of the first embodiment described above with reference to FIG. 7, and a description thereof is omitted.

In a period from a time t313 to a time t314, the reset pulse signal PRES is kept at the L level. The image pickup apparatus of the first embodiment described above with reference to FIG. 7 executes the resetting of the floating diffusion node 103 and N conversion by setting the reset pulse signal PRES to the H level in the period from the time t213 to the time t216. The resetting and the N conversion are not executed in this embodiment. This means that the floating diffusion node 103 keeps holding electric charges generated by the photodiode 101A.

In a period from a time t315 to a time t316, the transfer pulse signals PTXA and PTXB are changed from the L level to the H level, and back to the L level, thereby changing the on/off state of the transfer switches 102A and 102B from off to on, and back to off. This causes electric charges of the photodiode 101B to be transferred to the floating diffusion node 103. The electric charges generated by the photodiode 101B are added to the electric charges generated by the photodiode 101A in the floating diffusion node 103. An A+B image signal is consequently output to the vertical output line 107.

In a period from a time t317 to a time t318, the A+B image signal output to the vertical output line 107 is converted into a digital signal by the A/D converter 401 of the column reading unit 400. The digital signal obtained by the A/D converter 401 is held in the memory M1 of the memory unit 402.

In a period from a time t319 to a time t320, the horizontal scanning unit 302 outputs a horizontal scanning pulse signal, and an A+B image signal held in the memory M1 of each column and an N signal held in the memory M2 of each column are output sequentially. In this manner, an A image signal and an N signal associated with the A image signal are output, and an A+B image signal and an N signal associated with the A+B image signal are further output. The B image signal necessary for focus detection can be obtained by subtracting the A image signal from the A+B image signal in the signal processing unit 500 or other components.

When reading pixel signals out of the unit pixels 100 of a normal row, A+B image signals are read out as illustrated in FIG. 6. When reading pixel signals out of the unit pixels 100 of an AF row, A image signals and A+B image signals are read out as illustrated in FIG. 17. This manner of reading takes a shorter time than when an A image signal and a B image signal are read out of every unit pixel 100.

FIG. 18A is a diagram for illustrating an example of output signals from respective rows. In FIG. 18A, an A+B image signal is output from a normal row 1801, and an A image signal and an A+B image signal are output from an AF row 1802 and an AF row 1803, respectively.

FIG. 18B is a diagram for illustrating an example of dark current amounts in the respective rows. The dark current amounts illustrated in FIG. 18B are associated with the rows of FIG. 18A. A dark current amount 1805 of the A image signal output from the unit pixel 100 of the AF row 1802 is substantially a half of a dark current amount 1804 of the A+B image signal output from the unit pixel 100 of the normal row 1801. A dark current amount 1806 of the A+B image signal output from the unit pixel 100 of the AF row 1803 is substantially equal to the dark current amount 1804 of the A+B image signal output from the unit pixel 100 of the normal row 1801. The AF row 1802 outputs an A+B image signal in addition to the A image signal, and the AF row 1803 outputs an A image signal in addition to the A+B image signal.

As illustrated in FIG. 18C, the identification signal is set to the H level at the time when the A image signal is output from the AF row 1802. The shift of the identification signal from the L level to the H level switches correction processing in the correction processing unit 502, 1300, or 1500 as described above. Specifically, correction processing executed in the correction processing unit 502, 1300, or 1500 is switched so that a different correction is made when it is an A+B image signal that is read and when it is an A image signal that is read. This ensures that an appropriate correction value can be generated despite a large difference between the dark current of an A+B image signal and the dark current of an A image signal. The black level can thus be corrected favorably in this embodiment as well. The operation of the correction processing units 502, 1300, and 1500 is described in the first embodiment to the third embodiment, and therefore a description thereof is omitted here.

The image pickup apparatus thus may be configured so that A image signals and A+B image signals are output from the unit pixels 100 of an AF row.

Fifth Embodiment

An image pickup apparatus according to a fifth embodiment of the present invention and an image pickup system that uses the image pickup apparatus are described with reference to FIG. 19 to FIG. 23D. Components of the fifth embodiment that are the same as those in the image pickup apparatus and image pickup system according to the first to fourth embodiments which are illustrated in FIG. 1 to FIG. 18C are denoted by the same symbols, and descriptions on the components are omitted or simplified here.

The image pickup apparatus according to this embodiment executes processing of correcting the black level by using output signals from the unit pixels 100 that are located in a first reference pixel area 1901, which is in an upper or lower area of the pixel array 600 and which extends in the horizontal direction. The image pickup apparatus according to this embodiment also executes processing of correcting the black level by using output signals from the unit pixels 100 that are located in a second reference pixel area 1902, which is in a left or right area of the pixel array 600 and which extends in the vertical direction. The output signals from the unit pixels 100 that are located in the first reference pixel area 1901 are used in first-stage correction processing, where a dark current amount component is roughly removed from each column. The output signals from the unit pixels 100 that are located in the second reference pixel area 1902 are used in second-stage correction processing, where a component caused by fluctuations in dark current amount between rows is removed. In this embodiment, a difference between the dark current amount of a normal row and the dark current amount of an AF row, namely, an offset value, is calculated when a first correction processing unit 2001 executes correction processing with the use of the output signals from the unit pixels 100 that are located in the first reference pixel area 1901. A suitable offset value calculated in this manner is used in correction processing that is executed by a second correction processing unit 2002 with the use of the output signals from the unit pixels 100 that are located in the second reference pixel area 1902.

Figure 19:
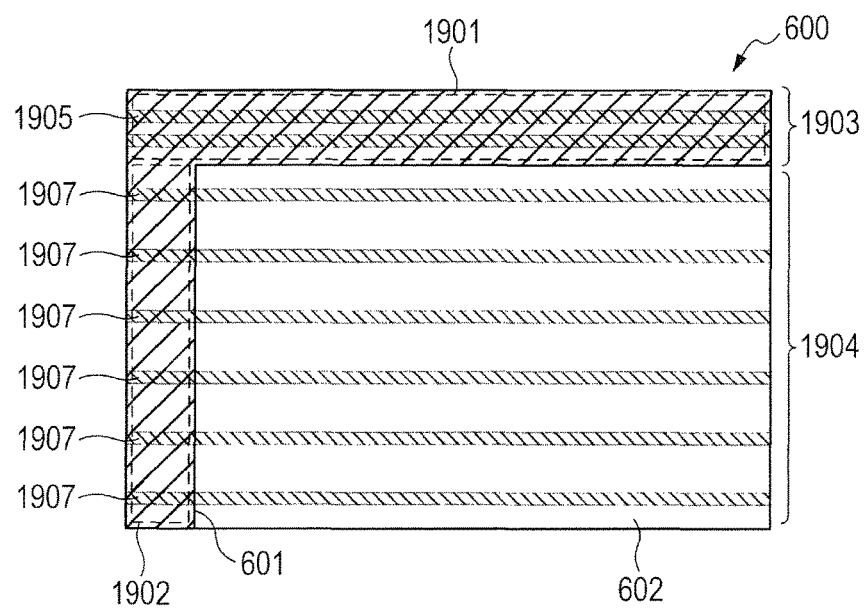
FIG. 19 is a plan view for illustrating the layout of a pixel array.

FIG. 19 is a plan view for illustrating the layout of the pixel array 600. The pixel array 600 of FIG. 19 corresponds to the pixel array 600 described in the first embodiment with reference to FIG. 4. As illustrated in FIG. 19, a part of the pixel array 600 is the reference pixel area 601 in which the photodiodes 101A and 101B are optically shielded. The reference pixel area 601 includes the first reference pixel area (vertical optical black area) 1901, which extends in the horizontal direction, and the second reference pixel area (horizontal optical black area) 1902, which extends in the vertical direction. The first reference pixel area 1901 and the second reference pixel area 1902 are for obtaining correction values that are used in the processing of correcting the black level. The area of the pixel array 600 that remains after excluding the reference pixel area 601 is the light-receiving pixel area (open pixel area) 602 in which an optical image of an object is received. Output signals from the unit pixels 100 that are located in the first reference pixel area 1901 are used to execute the first-stage correction processing (first-stage clamping processing) described later. Output signals from the unit pixels 100 that are located in the second reference pixel area 1902 are used to execute the second-stage correction processing (second-stage clamping processing) described later. A row group 1903 located in the first reference pixel area 1901 includes AF rows 1905 and normal rows (not shown). The unit pixels 100 that are aligned in the AF rows 1905 inside the first reference pixel area 1901 serve as a reference for the unit pixels 100 in AF rows 1907 inside the light-receiving pixel area 602. The unit pixels 100 that are aligned in the normal rows inside the first reference pixel area 1901 serve as a reference for the unit pixels 100 in normal rows inside the light-receiving pixel area 602. A row group 1904, which is partially located in the second reference pixel area 1902, includes the AF rows 1907 and normal rows (not shown). The unit pixels 100 that are aligned in the AF rows 1907 inside the second reference pixel area 1902 serve as a reference for the unit pixels 100 in the AF rows 1907 inside the light-receiving pixel area 602. The unit pixels 100 that are aligned in the normal rows inside the second reference pixel area 1902 serve as a reference for the unit pixels 100 in the normal rows inside the light-receiving pixel area 602. A normal row outputs the A+B image signal described above. Each AF row 1905 and each AF row 1907 outputs the A image signal and B image signal described above.

Figure 20:
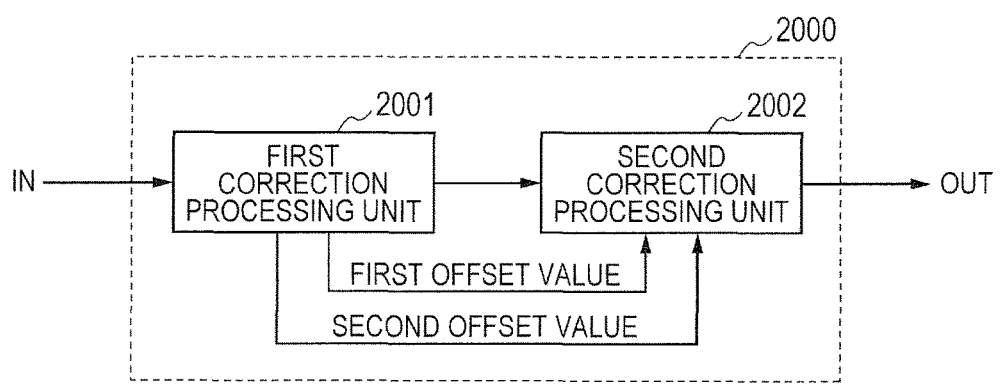
FIG. 20 is a block diagram for illustrating the configuration of a correction processing unit.

FIG. 20 is a block diagram for illustrating the configuration of a correction processing unit 2000. The correction processing unit 2000 illustrated in FIG. 20 corresponds to the correction processing unit 502 described in the first embodiment with reference to FIG. 9.

The correction processing unit 2000 includes the first correction processing unit 2001 configured to execute the first-stage correction processing, and the second correction processing unit 2002 configured to execute the second-stage correction processing. The first correction processing unit 2001 executes correction processing for correcting a black level to a reference level by using output signals from the unit pixels 100 that are located in the first reference pixel area 1901. The second correction processing unit 2002 executes correction processing for correcting a black level to a reference level by using output signals from the unit pixels 100 that are located in the second reference pixel area 1902. The first correction processing unit 2001 also provides a first offset value and a second offset value to the second correction processing unit 2002. Details of the first offset value and the second offset value are described later with reference to FIG. 21 and FIG. 22.

Figure 21:
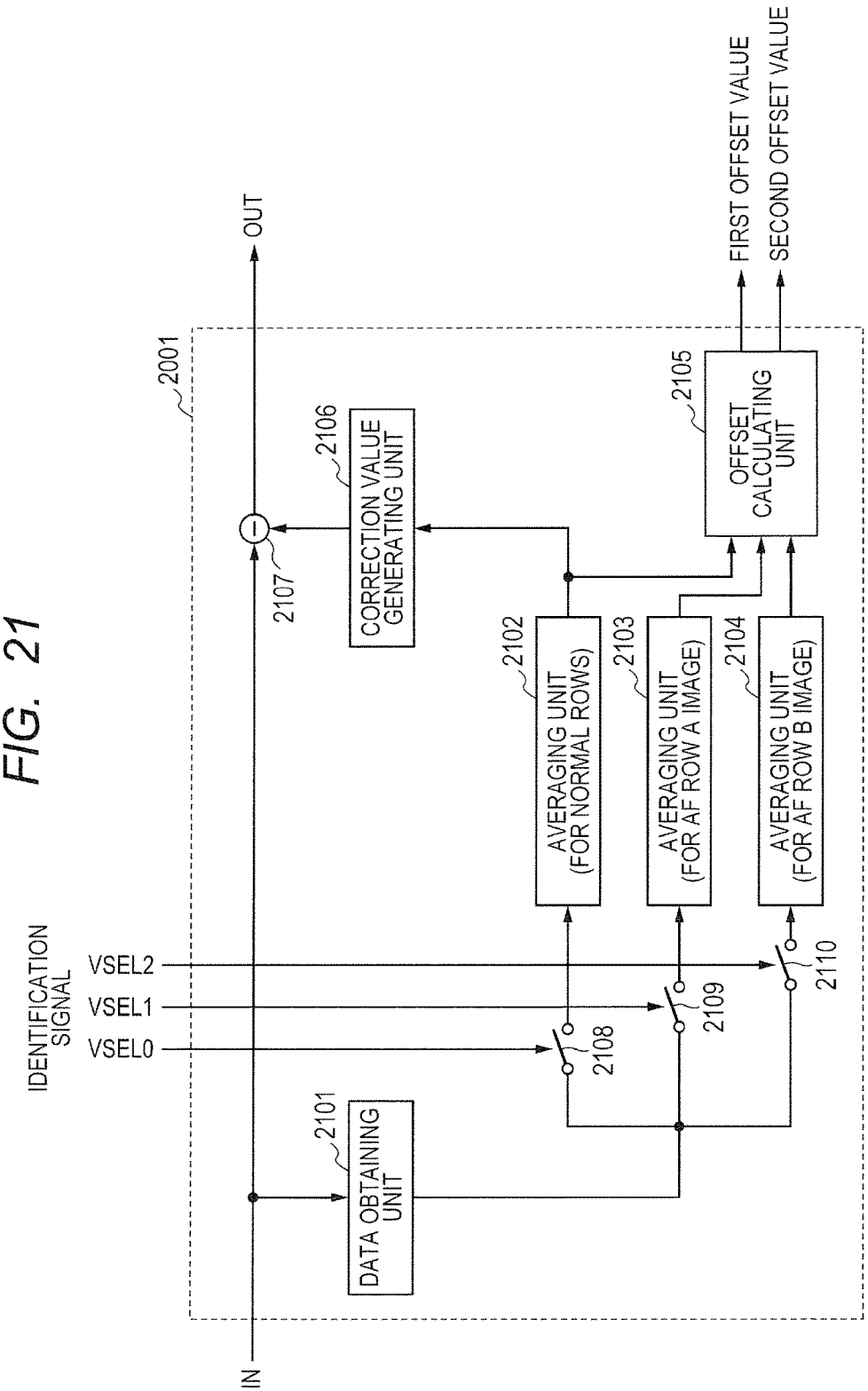
FIG. 21 is a block diagram for illustrating the configuration of a first correction processing unit.

FIG. 21 is a block diagram for illustrating the configuration of the first correction processing unit 2001. Pixel signals from which fixed-pattern noise has been removed by the S-N processing unit 501 (see FIG. 9) are input sequentially to the first correction processing unit 2001. Pixel signals read out of the unit pixels 100 that are located in the reference pixel area 601 are input to the first correction processing unit 2001 as well as pixel signals read out of the unit pixels 100 that are located in the light-receiving pixel area 602. A data obtaining unit 2101 is configured to selectively obtain, from among pixel signals input to the first correction processing unit 2001, pixel signals read out of the unit pixels 100 that are located in the first reference pixel area 1901. The data obtaining unit 2101 outputs the data to a processing block that is downstream of the data obtaining unit 2101, namely, a processing block for updating a correction value.

Averaging units 2102 to 2104 are each configured to calculate an average black level by performing averaging processing on pixel signals supplied from the data obtaining unit 2101, with the use of a given time constant. The averaging unit 2102 is an averaging unit for normal rows. Pixel signals from normal rows that are located in the first reference pixel area 1901 are input to the averaging unit 2102, which sequentially calculates average black levels of the normal rows. The averaging unit 2103 is an averaging unit for A image signals of AF rows. The averaging unit 2103 calculates the average black level of A image signals that are input from the AF rows 1905 located in the first reference pixel area 1901. The averaging unit 2104 is an averaging unit for B image signals of AF rows. The averaging unit 2104 calculates the average black level of B image signals that are input from the AF rows 1905 located in the first reference pixel area 1901. The averaging unit 2103 for A image signals and the averaging unit 2104 for B image signals may be replaced by a shared averaging unit.

The averaging units 2102 to 2104 execute averaging processing with the use of a time constant smaller than one that is used in averaging processing executed by an averaging unit 2202, which is placed in the second correction processing unit 2002 and which is described later with reference to FIG. 22. The averaging units 2102 to 2104 use, for example, a weighted moving average in the averaging processing. This enables the averaging units 2102 to 2104 to quickly follow newly obtained signals, and remove a component caused by fluctuations in dark current amount between columns satisfactorily without fail.

Switches 2108 to 2110 are configured to switch from one of the averaging units 2102 to 2104 to another to switch to which averaging unit pixel signals obtained by the data obtaining unit 2101 are supplied. The switch 2108 is controlled with an identification signal VSEL0, which indicates that signals input to the first correction processing unit 2001 are signals from a normal row that is located in the first reference pixel area 1901. The switch 2109 is controlled with an identification signal VSEL1, which indicates that signals input to the first correction processing unit 2001 are A image signals that are read out of one of the AF rows 1905 located in the first reference pixel area 1901. The switch 2110 is controlled with an identification signal VSEL2, which indicates that signals input to the first correction processing unit 2001 are B image signals that are read out of one of the AF rows 1905 located in the first reference pixel area 1901. The switches 2108 to 2110 are switched on when their associated identification signals VSEL0 to VSEL2 are at the H level. The identification signals VSEL0 to VSEL2 are supplied from, for example, the timing generating unit 303 described above with reference to FIG. 3.

Average black levels calculated separately by the averaging units 2102 to 2104 are input to an offset calculating unit 2105. The offset calculating unit 2105 then calculates a first offset value. The first offset value is a difference between the average black level of pixel signals from the unit pixels 100 of a normal row in the first reference pixel area 1901 and the average black level of A image signals from the unit pixels 100 of one of the AF rows 1905 in the first reference pixel area 1901. The offset calculating unit 2105 also calculates a second offset value. The second offset value is a difference between the average black level of the pixel signals from the unit pixels 100 of the normal row in the first reference pixel area 1901 and the average black level of B image signals from the unit pixels 100 of the AF row 1905 in the first reference pixel area 1901. The first offset value is obtained by subtracting the average black level of the A image signals that are output from the AF row 1905 from the average black level of the pixel signals that are output from the normal row. The second offset value is obtained by subtracting the average black level of the B image signals that are output from the AF row 1905 from the average black level of the pixel signals that are output from the normal row. The first offset value and second offset value calculated by the offset calculating unit 2105 are supplied to the second correction processing unit 2002.

A correction value generating unit 2106 is configured to generate a correction value for correcting the black level of a pixel signal to a reference level. The correction value is used to correct pixel signals read out of the unit pixels 100 that are located in the light-receiving pixel area 602. The average black level of pixel signals in a normal row that is calculated by the averaging unit 2102 is input to the correction value generating unit 2106. The correction value generating unit 2106 generates a correction value for correcting the black level based on the difference between the average black level of the normal row and a reference level.

A correction unit 2107 corrects the black level of the pixel signals output from the unit pixels 100 that are located in the light-receiving pixel unit 602 to the reference level by subtracting the correction value generated in the correction value generating unit 2106 from the pixel signals. This correction processing uses a correction value calculated by the averaging unit 2102, namely, a correction value calculated based on the average black level of pixel signals in a normal row, with the result that the black levels of A image signals and B image signals from the AF row 1905 deviate from the reference level. However, the deviation is corrected by using the first or second offset value calculated in the offset calculating unit 2105 when the second correction processing unit 2002, which is described later, executes the second-stage correction processing.

The correction unit 2107 performs correction processing not only on pixel signals output from the unit pixels 100 that are located in the light-receiving pixel area 602, but also on pixel signals output from the unit pixels 100 that are located in the reference pixel area 601. A reference level used when the correction value generating unit 2106 generates a correction value may or may not be the same as a reference level that is used when a correction value is generated in a correction value generating unit 2203 of the second correction processing unit 2002, which is described later.

Figure 22:
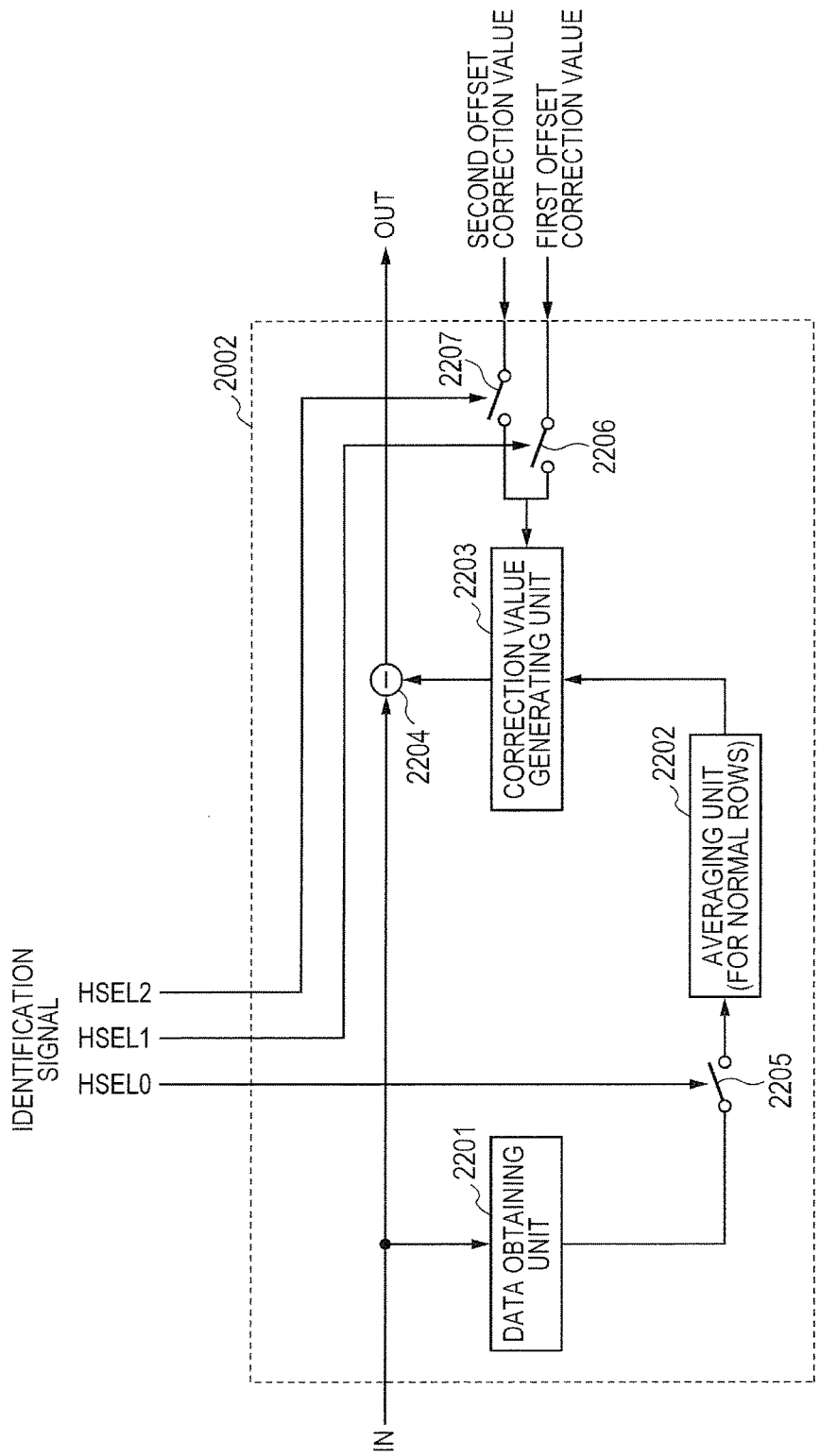
FIG. 22 is a block diagram for illustrating the configuration of a second correction processing unit.

FIG. 22 is a block diagram for illustrating the configuration of the second correction processing unit 2002. Image signals on which the first-stage correction processing has been performed by the first correction processing unit 2001 are input sequentially to the second correction processing unit 2002 as illustrated in FIG. 20. A data obtaining unit 2201 is configured to selectively obtain, from among pixel signals input to the second correction processing unit 2002, pixel signals read out of the unit pixels 100 that are located in the second reference pixel area 1902. The data obtaining unit 2201 outputs the data to a processing block that is downstream of the data obtaining unit 2201, namely, a processing block for updating a correction value.

The averaging unit 2202 sequentially calculates average black levels by performing average processing on the input pixel signals with the use of a given time constant. The first correction processing unit 2001 described above with reference to FIG. 21 is provided with three averaging units, specifically, the averaging unit 2102 for normal rows, the averaging unit 2103 for A image signals from an AF row, and the averaging unit 2104 for B image signals from an AF row. The second correction processing unit 2002, on the other hand, is provided only with the averaging unit 2202 for normal rows. The averaging unit 2202 executes averaging processing with the use of a time constant larger than the one that is used in the averaging processing executed by the averaging unit 2102 described above with reference to FIG. 21. This enables the averaging unit 2202 to loosely follow newly obtained signals, and remove a component caused by fluctuations in dark current amount between rows.

A switch 2205 is configured to selectively supply pixel signals of normal rows alone to the averaging unit 2202, out of pixel signals obtained by the data obtaining unit 2201. The switch 2205 is controlled with an identification signal HSEL0, which indicates that signals input to the second correction processing unit 2002 are pixel signals from a normal row.

The correction value generating unit 2203 is configured to generate a correction value for correcting a black level to a reference level. The average black level of pixel signals in a normal row that is calculated by the averaging unit 2202 is input to the correction value generating unit 2203. The first offset value and the second offset value calculated by the offset calculating unit 2105 of the first correction processing unit 2001 are further input to the correction value generating unit 2203 via a switch 2206 and a switch 2207, respectively. The correction value generating unit 2203 generates a correction value for correcting the black level of a normal row based on the difference between the average black level of pixel signals in a normal row that is calculated by the averaging unit 2202 and a reference level. The correction value generating unit 2203 generates a correction value for correcting the black level of an A image signal based on the difference between a value that is obtained by subtracting the first offset value from the average black level of a normal row and a reference level. The correction value generating unit 2203 generates a correction value for correcting the black level of a B image signal based on the difference between a value that is obtained by subtracting the second offset value from the average black level of a normal row and a reference level.

The switch 2206 is configured to supply the first offset value, which is calculated by the offset calculating unit 2105 of the first correction processing unit 2001, to the correction value generating unit 2203. The switch 2206 is controlled with an identification signal HSEL1, which indicates that signals input to the second correction processing unit 2002 are A image signals of an AF row. The switch 2207 is configured to supply the second offset value, which is calculated by the offset calculating unit 2105 of the first correction processing unit 2001, to the correction value generating unit 2203. The switch 2207 is controlled with an identification signal HSEL2, which indicates that signals input to the second correction processing unit 2002 are B image signals of an AF row. The switches 2205 to 2207 are switched on when their associated identification signals HSEL0 to HSEL2 are at the H level. The identification signals HSEL0 to HSEL2 are supplied from, for example, the timing generating unit 303 described above with reference to FIG. 3.

A correction unit 2204 is configured to correct a black level to a reference level by subtracting a correction value that is generated in the correction value generating unit 2203 from a pixel signal output from the unit pixel 100 that is located in the light-receiving pixel area 602.

In this embodiment, correction processing for a pixel signal output from the unit pixel 100 that is located in a normal row thus uses a correction value that is calculated based on the average black level of pixel signals in a normal row. Correction processing for a pixel signal output from the unit pixel 100 that is located in an AF row, on the other hand, uses a correction value that is calculated based on a value that is obtained by subtracting the first offset value or the second offset value from the average black level of pixel signals in a normal row. The black level can therefore be corrected properly in this embodiment even when there is a large difference between the dark current of a normal row and the dark current of an AF row. In addition, the correction value is updated based on the average black level of pixel signals in a normal row, which means that the black level can be corrected favorably even when AF rows are arranged discretely or there are only a few AF rows.

FIG. 23A to FIG. 23D are conceptual diagrams for illustrating processing that is executed in the correction processing unit 2000 of the image pickup apparatus according to this embodiment. FIG. 23A is a diagram for illustrating an example of the dark current amounts of pixel signals in respective rows that are input to the first correction processing unit 2001, an average black level 2304, and a correction value 2305.

The rows in FIG. 23A correspond to the rows in FIG. 8A and FIG. 8B which are described in the first embodiment. FIG. 23B is a diagram for illustrating an example of the identification signals VSEL0, VSEL1, and VSEL2, which are associated with the rows of FIG. 23A. FIG. 23C is a diagram for illustrating an example of the dark current amounts of pixel signals in respective rows that are input to the second correction processing unit 2002, an average black level 2308, and a correction value 2309. The rows in FIG. 23C correspond to the rows in FIG. 8A and FIG. 8B which are described in the first embodiment. FIG. 23D is a diagram for illustrating an example of the identification signals HSEL0, HSEL1, and HSEL2, which are associated with the rows of FIG. 23C.

When signals input to the first correction processing unit 2001 are pixel signals (A+B image signals) output from the unit pixels 100 of a normal row 2301, the identification signal VSEL0 is at the H level. The averaging unit 2102 for normal rows calculates the average black level 2304 in this case based on pixel signals output from the unit pixels 100 of a normal row in the first reference pixel area 1901. The average black level 2304 calculated by the averaging unit 2102 is indicated by the broken line in FIG. 23A. The correction value generating unit 2106 generates the correction value 2305, which is indicated by the arrow, based on a reference level and the average black level 2304.

When signals input to the first correction processing unit 2001 are pixel signals (A image signals) output from the unit pixels 100 of an AF row 2302 and pixel signals (B image signals) output from the unit pixels 100 of an AF row 2303, the identification signal VSEL0 is at the L level. The averaging unit 2102 in this case does not update the value of the average black level 2304.

When signals input to the first correction processing unit 2001 are A image signals from the unit pixels 100 of the AF row 2302, the identification signal VSEL1 is at the H level, and the averaging unit 2103 for A image signals of an AF row calculates an average black level. The averaging unit 2103 for A image signals of an AF row calculates an average black level in this case based on A image signals output from the unit pixels 100 of one of the AF rows 1905 in the first reference pixel area 1901.

When signals input to the first correction processing unit 2001 are B image signals from the unit pixels 100 of the AF row 2303, the identification signal VSEL2 is at the H level, and the averaging unit 2104 for B image signals of an AF row calculates an average black level. The averaging unit 2104 for B image signals of an AF row calculates an average black level in this case based on B image signals output from the unit pixels 100 of one of the AF rows 1905 in the first reference pixel area 1901.

The correction unit 2107 subtracts the correction value 2305 generated by the correction value generating unit 2106 from a pixel signal that is input to the first correction processing unit 2001, thereby correcting the black level of the pixel signal input to the first correction processing unit 2001 to a reference level. The correction processing uses the average black level 2304, which is calculated by the averaging unit 2102 based on pixel signals from the normal row 2301, and hence the black level of an image signal from the normal row 2301 approaches the reference level. On the other hand, the use of the thus calculated average black level 2304 in the correction processing causes the black levels of an A image signal from the AF row 2302 and of a B image signal from the AF row 2303 to deviate from the reference level as illustrated in FIG. 23A.

When signals input to the second correction processing unit 2002 are pixel signals (A+B image signals) output from the unit pixels 100 of the normal row 2301, the identification signal HSEL0 is at the H level. The averaging unit 2202 for normal rows calculates the average black level 2308 in this case based on pixel signals output from the unit pixels 100 of a normal row in the second reference pixel area 1902. The average black level 2308 calculated by the averaging unit 2202 is indicated by the broken line in FIG. 23C. The correction value generating unit 2203 generates the correction value 2309, which is indicated by the arrow, based on a reference level and the average black level 2308.

When signals input to the second correction processing unit 2002 are pixel signals (A image signals) output from the unit pixels 100 of the AF row 2302 and pixel signals (B image signals) output from the unit pixels 100 of the AF row 2303, the identification signal HSEL0 is at the L level. The averaging unit 2202 in this case does not update the value of the average black level 2308.

When signals input to the second correction processing unit 2002 are A image signals from the unit pixels 100 of the AF row 2302, the identification signal HSEL1 is at the H level. The switch 2206 is switched on in this case to supply the first offset value calculated in the offset calculating unit 2105 of the first correction processing unit 2001 to the correction value generating unit 2203. The correction value generating unit 2203 generates a correction value 2306, which is indicated by the arrow, based on the difference between a value that is obtained by subtracting the first offset value from the average black level 2308 of a normal row and a reference level.

When signals input to the second correction processing unit 2002 are B image signals from the unit pixels 100 of the AF row 2303, the identification signal HSEL2 is at the H level. The switch 2207 is switched on in this case to supply the second offset value calculated in the offset calculating unit 2105 of the first correction processing unit 2001 to the correction value generating unit 2203. The correction value generating unit 2203 generates a correction value 2307, which is indicated by the arrow, based on the difference between a value that is obtained by subtracting the second offset value from the average black level 2308 of a normal row and a reference level.

The correction unit 2204 subtracts, from a pixel signal input to the second correction processing unit 2002, a suitable correction value that is one of the correction values 2309, 2306, and 2307 generated in the correction value generating unit 2203, thereby correcting the black level of the pixel signal to the reference level. Black level correction of an A image signal uses the correction value 2306, which is generated based on the difference between a value that is obtained by subtracting the first offset value from the average black level 2308 of a normal row and a reference level. The black level of an A image signal can therefore be corrected properly. Black level correction of a B image signal uses the correction value 2307, which is generated based on the difference between a value that is obtained by subtracting the second offset value from the average black level 2308 of a normal row and a reference level. The black level of a B image signal can therefore be corrected properly.

An appropriate correction value can thus be generated in this embodiment as well without being affected by the difference between the dark current level of the normal row 2301 and the dark current level of the AF row 2302 or 2303. Proper black level correction is accomplished as a result.

Sixth Embodiment

An image pickup apparatus according to a sixth embodiment of the present invention and an image pickup system that uses the image pickup apparatus are described with reference to FIG. 24 to FIG. 27D. Components of the sixth embodiment that are the same as those in the image pickup apparatus and image pickup system according to the first to fifth embodiments which are illustrated in FIG. 1 to FIG. 23D are denoted by the same symbols, and descriptions on the components are omitted or simplified here.

In this embodiment, the method described in the fifth embodiment is applied to an image pickup apparatus configured to output an A image signal and an A+B image signal from an AF row. The image pickup apparatus configured to output an A image signal and an A+B image signal from an AF row is described in the fourth embodiment, and therefore a description of the image pickup apparatus is omitted here.

The first-stage correction processing in this embodiment, which uses output signals from the unit pixels 100 that are located in the first reference pixel area 1901, includes the calculation of values described below. One of the calculated values is a difference between the dark current amount of an A+B image signal from the unit pixel 100 that is located in a normal row and the dark current amount of an A image signal from the unit pixel 100 that is located in an AF row (the first offset value). The other calculated value is a difference between the dark current amount of an A+B image signal from the unit pixel 100 that is located in a normal row and the dark current amount of an A+B image signal from the unit pixel 100 that is located in an AF row (the second offset value). The first offset value and the second offset value are used in a suitable manner in the second-stage correction processing, which uses output signals from the unit pixels 100 that are located in the second reference pixel area 1902. The black level can be corrected properly in this embodiment as well despite a difference in dark current amount between an A+B image signal from the unit pixel 100 that is located in a normal row and an A image signal from the unit pixel 100 that is located in an AF row. In addition, proper black level correction is accomplished despite a difference in dark current amount that is caused by a drive timing difference or other factors between an A+B image signal from the unit pixel 100 that is located in a normal row and an A+B image signal from the unit pixel 100 that is located in an AF row.

Figure 24:
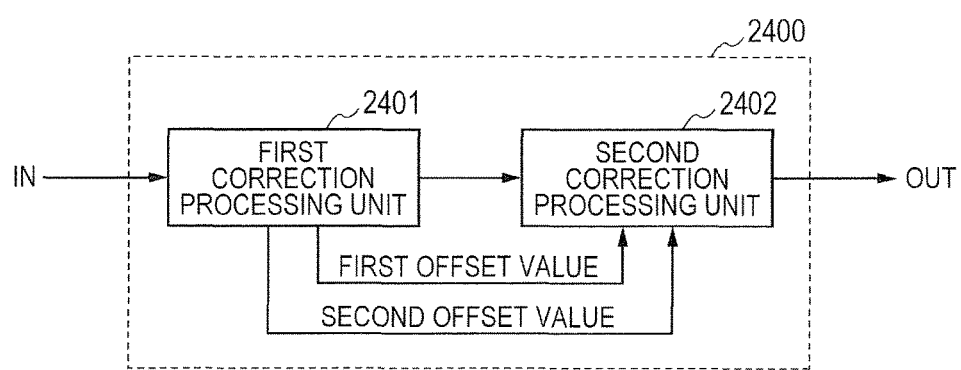
FIG. 24 is a block diagram for illustrating the configuration of a correction processing unit.

FIG. 24 is a block diagram for illustrating the configuration of a correction processing unit 2400. The correction processing unit 2400 illustrated in FIG. 24 corresponds to the correction processing unit 502 described in the first embodiment with reference to FIG. 9.

The correction processing unit 2400 includes a first correction processing unit 2401 configured to execute the first-stage correction processing, and a second correction processing unit 2402 configured to execute the second-stage correction processing. The first correction processing unit 2401 executes correction processing for correcting a black level to a reference level by using pixel signals from the unit pixels 100 that are located in the first reference pixel area 1901. The second correction processing unit 2402 executes correction processing for correcting a black level to a reference level by using pixel signals from the unit pixels 100 that are located in the second reference pixel area 1902. The first correction processing unit 2401 also provides a first offset value and a second offset value to the second correction processing unit 2402. Details of the first offset value and the second offset value are described later with reference to FIG. 25 and FIG. 26.

Figure 25:
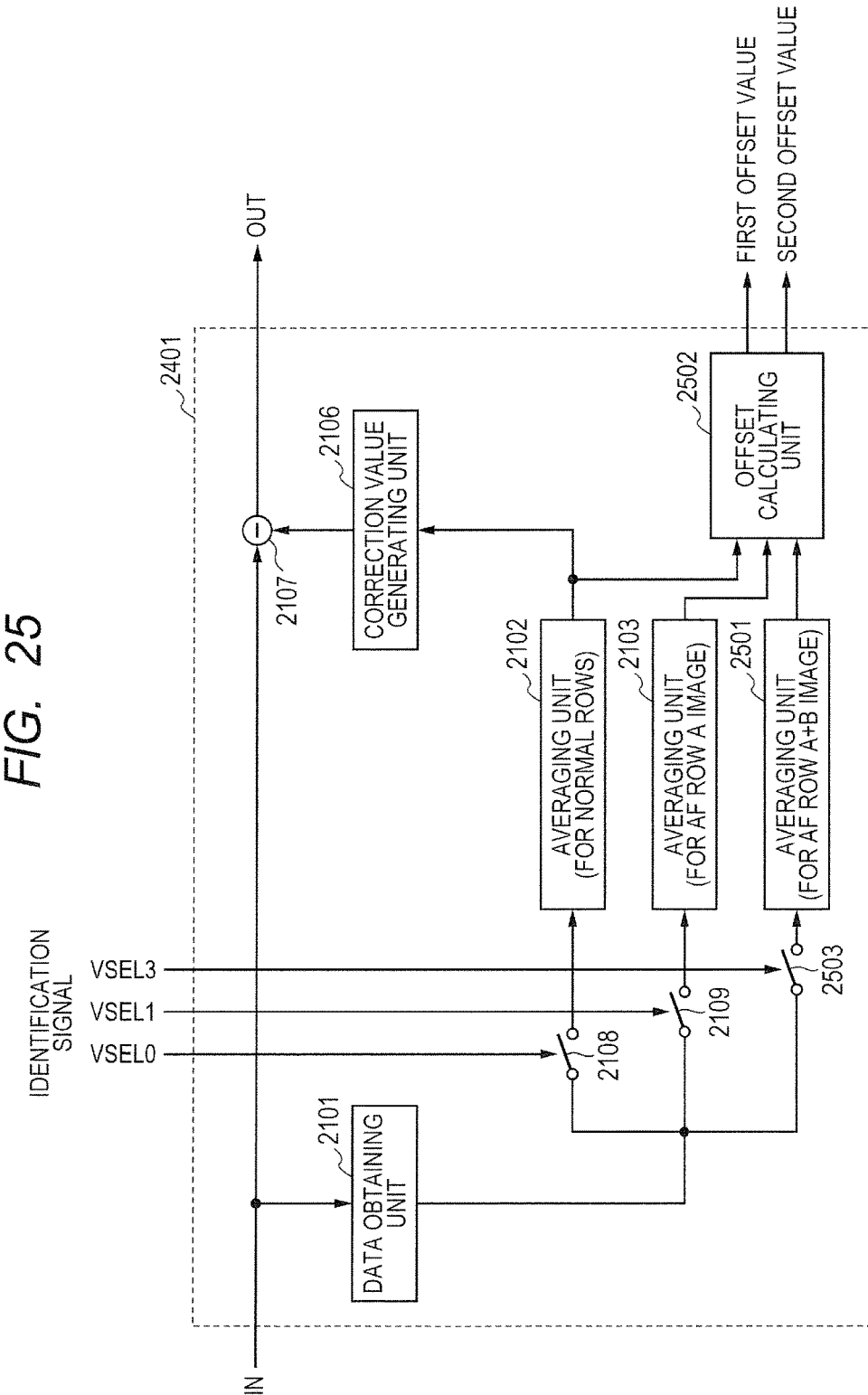
FIG. 25 is a block diagram for illustrating the configuration of a first correction processing unit.

FIG. 25 is a block diagram for illustrating the configuration of the first correction processing unit 2401. The first correction processing unit 2401 illustrated in FIG. 25 corresponds to the first correction processing unit 2001 described in the fifth embodiment with reference to FIG. 21. Pixel signals from which fixed-pattern noise has been removed by the S-N processing unit 501 (see FIG. 9) are sequentially input to the first correction processing unit 2401. Pixel signals read out of the unit pixels 100 that are located in the reference pixel area 601 as well as pixel signals read out of the unit pixels 100 that are located in the light-receiving pixel area 602 are input to the first correction processing unit 2401.

An averaging unit 2501 is an averaging unit for A+B image signals of AF rows. The averaging unit 2501 calculates the average black level of A+B image signals that are input from the unit pixels 100 of one of the AF rows 1905 located in the first reference pixel area 1901. A switch 2503 is configured to selectively supply, from among pixel signals obtained by the data obtaining unit 2101, A+B image signals that are output from the unit pixels 100 of the AF row 1905 located in the first reference pixel area 1901 to the averaging unit 2501. The switch 2503 is controlled with an identification signal VSEL3, which indicates that signals input to the first correction processing unit 2401 are A+B image signals that are output from the unit pixels 100 of the AF row 1905 located in the first reference pixel area 1901.

Average black levels calculated separately by the averaging units 2102, 2103, and 2501 are input to an offset calculating unit 2502. The offset calculating unit 2502 then calculates a first offset value. The first offset value is a difference between the average black level of pixel signals from the unit pixels 100 of a normal row in the first reference pixel area 1901 and the average black level of A image signals from the unit pixels 100 of one of the AF rows 1905 in the first reference pixel area 1901. The offset calculating unit 2502 also calculates a second offset value. The second offset value is a difference between the average black level of the pixel signals from the unit pixels 100 of the normal row in the first reference pixel area 1901 and the average black level of A+B image signals from the unit pixels 100 of the AF row 1905 in the first reference pixel area 1901. The first offset value is obtained by subtracting the average black level of the A image signals that are output from the unit pixels 100 of the AF row 1905 in the first reference pixel area 1901 from the average black level of the pixel signals that are output from the unit pixels 100 of the normal row in the first reference pixel area 1901. The second offset value is obtained by subtracting the average black level of the A+B image signals that are output from the unit pixels 100 of the AF row 1905 in the first reference pixel area 1901 from the average black level of the pixel signals that are output from the unit pixels 100 of the normal row in the first reference pixel area 1901. The first offset value and the second offset value calculated in the offset calculating unit 2502 are supplied to the second correction processing unit 2402.

Figure 26:
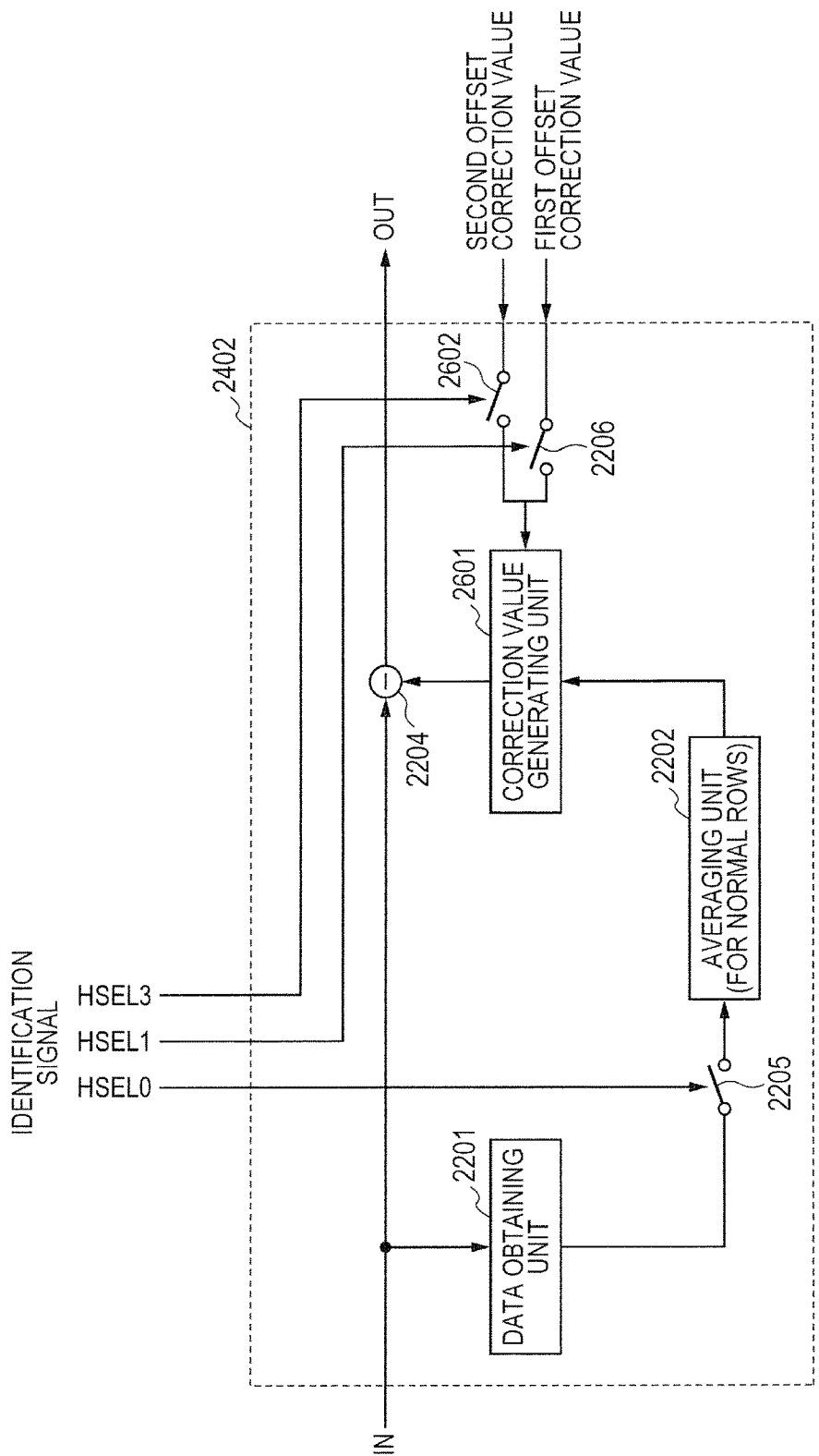
FIG. 26 is a block diagram for illustrating the configuration of a second correction processing unit.

FIG. 26 is a block diagram for illustrating the configuration of the second correction processing unit 2402. The second correction processing unit 2402 illustrated in FIG. 26 corresponds to the second correction processing unit 2002 described in the fifth embodiment with reference to FIG. 22. As illustrated in FIG. 24, image signals to which correction processing has been executed by the first correction processing unit 2401 are sequentially input to the second correction processing unit 2402.

The correction value generating unit 2601 is configured to generate a correction value for correcting a black level to a reference level. The average black level of pixel signals in a normal row that is calculated by the averaging unit 2202 is input to the correction value generating unit 2601. The first offset value and the second offset value calculated by the offset calculating unit 2502 of the first correction processing unit 2401 are further input to the correction value generating unit 2601 via the switch 2206 and a switch 2602, respectively.

The correction value generating unit 2601 generates a correction value for correcting the black level of a normal row based on the difference between the average black level of pixel signals in a normal row that is calculated by the averaging unit 2202 and a reference level.

The correction value generating unit 2601 generates a correction value for correcting the black level of an A image signal of an AF row based on the difference between a value that is obtained by subtracting the first offset value from the average black level of a normal row and a reference level. The correction value generating unit 2601 generates a correction value for correcting the black level of an A+B image signal of an AF row based on the difference between a value that is obtained by subtracting the second offset value from the average black level of a normal row and a reference level.

The switch 2602 is configured to supply the second offset value, which is calculated by the offset calculating unit 2502 of the first correction processing unit 2401, to the correction value generating unit 2601. The switch 2602 is controlled with an identification signal HSEL3, which indicates that signals input to the second correction processing unit 2402 are A+B image signals of an AF row.

FIG. 27A to FIG. 27D are conceptual diagrams for illustrating processing that is executed in the correction processing unit 2400 of the image pickup apparatus according to this embodiment. FIG. 27A is a diagram for illustrating an example of the dark current amounts of pixel signals in respective rows that are input to the first correction processing unit 2401, the average black level 2304, and the correction value 2305. The rows in FIG. 27A correspond to the rows in FIG. 18A and FIG. 18B which are described in the fourth embodiment. FIG. 27B is a diagram for illustrating an example of the identification signals VSEL0, VSEL1, and VSEL3, which are associated with the rows of FIG. 27A. FIG. 27C is a diagram for illustrating an example of the dark current amounts of pixel signals in respective rows that are input to the second correction processing unit 2402, the average black level 2308, and the correction value 2309. The rows in FIG. 27C correspond to the rows in FIG. 18A and FIG. 18B which are described in the fourth embodiment. FIG. 27D is a diagram for illustrating an example of the identification signals HSEL0, HSEL1, and HSEL3, which are associated with the rows of FIG. 27C.

When signals input to the first correction processing unit 2401 are pixel signals (A+B image signals) output from the unit pixels 100 of the normal row 2301, the identification signal VSEL0 is at the H level. The averaging unit 2102 for normal rows calculates the average black level 2304 in this case based on pixel signals output from the unit pixels 100 of a normal row in the first reference pixel area 1901. The average black level 2304 calculated by the averaging unit 2102 is indicated by the broken line in FIG. 27A. The correction value generating unit 2106 generates the correction value 2305, which is indicated by the arrow, based on a reference level and the average black level 2304.

When signals input to the first correction processing unit 2401 are pixel signals (A image signals) output from the unit pixels 100 of the AF row 2302 and pixel signals (A+B image signals) output from the unit pixels 100 of an AF row 2701, the identification signal VSEL0 is at the L level. The averaging unit 2102 in this case does not update the value of the average black level 2304.

When signals input to the first correction processing unit 2401 are A image signals from the unit pixels 100 of the AF row 2302, the identification signal VSEL1 is at the H level, and the averaging unit 2103 for A image signals of an AF row calculates an average black level. The averaging unit 2103 for A image signals of an AF row calculates an average black level in this case based on A image signals output from the unit pixels 100 of one of the AF rows 1905 in the first reference pixel area 1901.

When signals input to the first correction processing unit 2401 are A+B image signals from the unit pixels 100 of the AF row 2701, the identification signal VSEL3 is at the H level, and the averaging unit 2501 for A+B image signals of an AF row calculates an average black level. The averaging unit 2501 for A+B image signals of an AF row calculates an average black level in this case based on A+B image signals output from the unit pixels 100 of one of the AF rows 1905 in the first reference pixel area 1901.

The correction unit 2107 subtracts the correction value 2305 generated by the correction value generating unit 2106 from a pixel signal that is input to the first correction processing unit 2401, thereby correcting the black level of the pixel signal input to the first correction processing unit 2401 to a reference level. The correction processing uses the average black level 2304, which is calculated by the averaging unit 2102 based on pixel signals from the normal row 2301, and hence the black level of an image signal from the normal row 2301 approaches the reference level. On the other hand, the use of the thus calculated average black level 2304 in the correction processing causes the black level of an A image signal from the AF row 2302 to deviate from the reference level as illustrated in FIG. 27A. As described above, there are cases where a drive timing difference or other factors cause a difference in dark current amount between an A+B image signal from the unit pixel 100 that is located in a normal row and an A+B image signal from the unit pixel 100 that is located in an AF row. The correction processing using the average black level 2304 that is calculated in the manner described above may cause the black level of an A+B image signal that is output from the AF row 2302 to deviate from the reference level as illustrated in FIG. 27A.

When signals input to the second correction processing unit 2402 are pixel signals (A+B image signals) output from the unit pixels 100 of the normal row 2301, the identification signal HSEL0 is at the H level. The averaging unit 2202 for normal rows calculates the average black level 2308 in this case based on pixel signals output from the unit pixels 100 of a normal row in the second reference pixel area 1902. The average black level 2308 calculated by the averaging unit 2202 is indicated by the broken line in FIG. 27C. The correction value generating unit 2601 generates the correction value 2309, which is indicated by the arrow, based on a reference level and the average black level 2308.

When signals input to the second correction processing unit 2402 are pixel signals (A image signals) output from the unit pixels 100 of the AF row 2302 and pixel signals (A+B image signals) output from the unit pixels 100 of the AF row 2701, the identification signal HSEL0 is at the L level. The averaging unit 2202 in this case does not update the value of the average black level 2308.

When signals input to the second correction processing unit 2402 are A image signals from the unit pixels 100 of the AF row 2302, the identification signal HSEL1 is at the H level. The switch 2206 is switched on in this case to supply the first offset value calculated in the offset calculating unit 2502 of the first correction processing unit 2401 to the correction value generating unit 2601. The correction value generating unit 2601 generates the correction value 2306, which is indicated by the arrow, based on the difference between a value that is obtained by subtracting the first offset value from the average black level 2308 of a normal row and a reference level.

When signals input to the second correction processing unit 2402 are A+B image signals from the unit pixels 100 of the AF row 2701, the identification signal HSEL3 is at the H level. The switch 2602 is switched on in this case to supply the second offset value calculated in the offset calculating unit 2502 of the first correction processing unit 2401 to the correction value generating unit 2601. The correction value generating unit 2601 generates a correction value 2702, which is indicated by the arrow, based on the difference between a value that is calculated by subtracting the second offset value from the average black level 2308 of a normal row and a reference level.

The correction unit 2204 subtracts, from a pixel signal input to the second correction processing unit 2402, a suitable correction value that is one of the correction values 2309, 2306, and 2702 generated in the correction value generating unit 2601, thereby correcting the black level of the pixel signal to the reference level. Black level correction of an A image signal uses the correction value 2306, which is generated based on the difference between a value that is obtained by subtracting the first offset value from the average black level 2308 of a normal row and a reference level. The black level of an A image signal can therefore be corrected properly. Black level correction of an A+B image signal uses the correction value 2702, which is generated based on the difference between a value that is obtained by subtracting the second offset value from the average black level 2308 of a normal row and a reference level. The black level of an A+B image signal can therefore be corrected properly.

As described above, according to this embodiment, an appropriate correction value can thus be generated even when there is a difference between the dark current amount of an A+B image signal that is output from the normal row 2301 and the dark current amount of an A+B image signal that is output from the AF row 2701. Proper black level correction is therefore accomplished in this embodiment as well.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, while the descriptions of the embodiments given above take as an example a case where the two photodiodes 101A and 101B are provided in a single unit pixel 100, the number of photodiodes provided in a single unit pixel 100 is not limited thereto. Four photodiodes, for example, may be provided in a single unit pixel 100. In this case, the gain multiplication unit 1303 multiplies a signal by a quadrupling gain, and the gain multiplication unit 1305 or 1504 multiplies a signal by a quartering gain.

The descriptions of the embodiments given above take as an example a case where the correction processing unit 502 is provided inside the image pickup element 1000. However, the correction processing unit 502 may be provided outside the image pickup element 1000 instead. For example, a part of the external signal processing unit 1001 illustrated in FIG. 2 may function as the correction processing unit 502.

This application claims the benefit of Japanese Patent Application No. 2015-222152, filed Nov. 12, 2015, and Japanese Patent Application No. 2016-127627, filed Jun. 28, 2016, which are hereby incorporated by reference herein in their entirety.

What is claimed is:

1. An image pickup apparatus, comprising:
a pixel array including a plurality of unit pixels arranged into a matrix pattern, the plurality of unit pixels each including a plurality of photoelectric converters, some of the plurality of unit pixels located in a first row group being to be read in a first mode for reading a signal corresponding to combined electric charges that are obtained by combining electric charges separately generated by the plurality of photoelectric converters of each of the plurality of unit pixels, some others of the plurality of unit pixels located in a second row group, which is different from the first row group, being to be read in a second mode for reading a signal corresponding to electric charges that are generated by any one of the plurality of photoelectric converters of each of the plurality of unit pixels;
a correction value generating circuit that generates a first correction value for correcting a signal that is read in the first mode out of the unit pixel that is located in a light-receiving pixel area of the pixel array, and generates a second correction value that is different from the first correction value, for correcting a signal that is read in the second mode out of the unit pixel that is located in the light-receiving pixel area, the first correction value and the second correction value being generated based on signals that are read out of the unit pixels that are located in a reference pixel area of the pixel array; and
a correction circuit that corrects, by using the first correction value, the signal that is read in the first mode out of the unit pixel that is located in the light-receiving pixel area, and corrects, by using the second correction value, the signal that is read in the second mode out of the unit pixel that is located in the light-receiving pixel area.

2. The image pickup apparatus according to claim 1, further comprising:
a first averaging circuit that obtains an average value of signals that are sequentially read in the first mode out of the unit pixels that are located in the reference pixel area; and a second averaging circuit that obtains an average value of signals that are sequentially read in the second mode out of the unit pixels that are located in the reference pixel area, wherein the correction value generating circuit generates the first correction value based on the average value that is obtained by the first averaging circuit, and generates the second correction value based on the average value that is obtained by the second averaging circuit.

3. The image pickup apparatus according to claim 1, further comprising an averaging circuit that obtains an average value of signals that are sequentially read in the first mode out of the unit pixels that are located in the reference pixel area, and of signals obtained by multiplying, by a first gain, signals that are sequentially read in the second mode out of the unit pixels that are located in the reference pixel area, wherein the correction value generating circuit generates the first correction value based on the average value that is obtained by the averaging circuit, and generates the second correction value based on a value that is calculated through multiplication in which the average value obtained by the averaging circuit is multiplied by a second gain.

4. The image pickup apparatus according to claim 1, further comprising an averaging circuit that obtains an average value of signals that are sequentially read in the first mode out of the unit pixels that are located in the reference pixel area, wherein the correction value generating circuit generates the first correction value based on the average value that is obtained by the averaging circuit, and generates the second correction value based on a value that is calculated through multiplication in which the average value obtained by the averaging circuit is multiplied by a second gain.

5. The image pickup apparatus according to claim 3, wherein the first gain is larger than 1.

6. The image pickup apparatus according to claim 3, wherein the second gain is smaller than 1.

7. The image pickup apparatus according to claim 1, further comprising:

a first averaging circuit that obtains an average value of signals that are sequentially read in the first mode out of the unit pixels that are located in the reference pixel area;

a second averaging circuit that obtains an average value of signals that are sequentially read in the second mode out of the unit pixels that are located in the reference pixel area;

an offset calculating circuit that calculates a first offset value based on a difference between the average value that is obtained by the first averaging circuit and the average value that is obtained by the second averaging circuit;

another correction value generating circuit that generates a third correction value based on the average value that is obtained by the first averaging circuit;

another correction circuit that corrects, by using the third correction value, a signal read in the first mode out of the unit pixel that is located in the reference pixel area, a signal read in the first mode out of the unit pixel that is located in the light-receiving pixel area, and a signal read in the second mode out of the unit pixel that is located in the light-receiving pixel area; and a third averaging circuit that obtains an average value of signals that are obtained through correction in which signals sequentially read in the first mode out of the unit pixels that are located in the reference pixel area are corrected by the another correction circuit, wherein the correction value generating circuit generates the first correction value based on the average value that is obtained by the third averaging circuit, and generates the second correction value based on the average value that is obtained by the third averaging circuit and on the first offset value, and wherein the correction circuit that corrects, by using the first correction value, a signal obtained through correction in which the another correction circuit corrects the signal read in the first mode out of the unit pixel that is located in the light-receiving pixel area, and corrects, by using the second correction value, a signal obtained through correction in which the another correction circuit corrects the signal read in the second mode out of the unit pixel that is located in the light-receiving pixel area.

8. The image pickup apparatus according to claim 7, wherein the plurality of unit pixels located in the light-receiving pixel area include a first unit pixel and a second unit pixel, the first unit pixel being a pixel that is used in focus detection, the second unit pixel being a pixel that is irrelevant to the focus detection, wherein the plurality of unit pixels located in the reference pixel area include a third unit pixel and a fourth unit pixel, the third unit pixel serving as a reference for the first unit pixel, the fourth unit pixel serving as a reference for the second unit pixel, wherein the image pickup apparatus further comprises a fourth averaging circuit that obtains an average value of signals that are sequentially read in the first mode out of the third unit pixel, wherein the offset calculating circuit calculates a second offset value based on a difference between the average value that is obtained by the first averaging circuit and the average value that is obtained by the fourth averaging circuit, wherein the first correction value is for correcting a signal that is read in the first mode out of the second unit pixel, and wherein the correction value generating circuit further generates a fourth correction value for correcting a signal that is read in the first mode out of the first unit pixel, based on the average value that is obtained by the third averaging circuit and on the second offset value.

9. An image pickup method, comprising:

reading signals in a first mode out of unit pixels that are located in a first row group of a pixel array, the pixel array including a plurality of unit pixels arranged into a matrix pattern, the plurality of unit pixels each including a plurality of photoelectric converters, the first mode involving reading a signal corresponding to combined electric charges that are obtained by combining electric charges that are separately generated by the plurality of photoelectric converters of each of the plurality of unit pixels;

generating a first correction value for correcting a signal that is read in the first mode out of the unit pixel that is located in a light-receiving pixel area of the pixel array, based on signals that are read out of the unit pixels that are located in a reference pixel area of the pixel array;

correcting, by using the first correction value, the signal that is read in the first mode out of the unit pixel that is located in the light-receiving pixel area;

reading signals in a second mode out of the unit pixels that are located in a second row group, which is different from the first row group, the second mode involving reading a signal corresponding to electric charges that are generated in any one of the plurality of photoelectric converters of each of the plurality of unit pixels;

generating a second correction value that is different from the first correction value, for correcting a signal that is read in the second mode out of the unit pixel that is located in the light-receiving pixel area, based on signals that are read out of the unit pixels that are located in the reference pixel area of the pixel array; and correcting, by using the second correction value, the signal that is read in the second mode out of the unit pixel that is located in the light-receiving pixel area.

10. A non-transitory computer-readable storage medium storing a program for causing a computer to:

read signals in a first mode out of unit pixels that are located in a first row group of a pixel array, the pixel array including a plurality of unit pixels arranged into a matrix pattern, the plurality of unit pixels each including a plurality of photoelectric converters, the first mode involving reading a signal corresponding to combined electric charges that are obtained by combining electric charges that are separately generated by the plurality of photoelectric converters of each of the plurality of unit pixels;

generate a first correction value for correcting a signal that is read in the first mode out of the unit pixel that is located in a light-receiving pixel area of the pixel array, based on signals that are read out of the unit pixels that are located in a reference pixel area of the pixel array;

correct, by using the first correction value, the signal that is read in the first mode out of the unit pixel that is located in the light-receiving pixel area;

read signals in a second mode out of the unit pixels that are located in a second row group, which is different from the first row group, the second mode involving reading a signal corresponding to electric charges that are generated in any one of the plurality of photoelectric converters of each of the plurality of unit pixels;

generate a second correction value that is different from the first correction value, for correcting a signal that is read in the second mode out of the unit pixel that is located in the light-receiving pixel area, based on signals that are read out of the unit pixels that are located in the reference pixel area of the pixel array; and correct, by using the second correction value, the signal that is read in the second mode out of the unit pixel that is located in the light-receiving pixel area.

11. An image pickup apparatus, comprising:

a pixel array including a plurality of unit pixels arranged into a matrix pattern, the plurality of unit pixels each including a plurality of photoelectric converters;

a driving circuit that drives the pixel array in any one of a first mode for reading a signal corresponding to combined electric charges that are obtained by combining electric charges separately generated by the plurality of photoelectric converters of each of the plurality of unit pixels, and a second mode for reading a signal corresponding to electric charges that are generated by any one of the plurality of photoelectric converters of each of the plurality of unit pixels;

a correction value generating circuit that generates a first correction value for correcting a signal that is read in the first mode out of the unit pixel that is located in a light-receiving pixel area of the pixel array, and generates a second correction value that is different from the first correction value, for correcting a signal that is read in the second mode out of the unit pixel that is located in the light-receiving pixel area, based on signals that are read out of the unit pixels that are located in a reference pixel area of the pixel array; and a correction circuit that corrects, by using the first correction value, the signal that is read in the first mode out of the unit pixel that is located in the light-receiving pixel area, and corrects, by using the second correction value, the signal that is read in the second mode out of the unit pixel that is located in the light-receiving pixel area.

12. The image pickup apparatus according to claim 11, further comprising:

a first averaging circuit that obtains an average value of signals that are sequentially read in the first mode out of the unit pixels that are located in the reference pixel area; and a second averaging circuit that obtains an average value of signals that are sequentially read in the second mode out of the unit pixels that are located in the reference pixel area, wherein the correction value generating circuit generates the first correction value based on the average value that is obtained by the first averaging circuit, and generates the second correction value based on the average value that is obtained by the second averaging circuit.

13. The image pickup apparatus according to claim 11, further comprising an averaging circuit that obtains an average value of signals that are sequentially read in the first mode out of the unit pixels that are located in the reference pixel area, and of signals obtained by multiplying, by a first gain, signals that are sequentially read in the second mode out of the unit pixels that are located in the reference pixel area, wherein the correction value generating circuit generates the first correction value based on the average value that is obtained by the averaging circuit, and generates the second correction value based on a value that is calculated through multiplication in which the average value obtained by the averaging circuit is multiplied by a second gain.

14. The image pickup apparatus according to claim 11, further comprising an averaging circuit that obtains an average value of signals that are sequentially read in the first mode out of the unit pixels that are located in the reference pixel area, wherein the correction value generating circuit generates the first correction value based on the average value that is obtained by the averaging circuit, and generates the second correction value based on a value that is calculated through multiplication in which the average value obtained by the averaging circuit is multiplied by a second gain.

15. The image pickup apparatus according to claim 13, wherein the first gain is larger than 1.

16. The image pickup apparatus according to claim 13, wherein the second gain is smaller than 1.

17. The image pickup apparatus according to claim 11, further comprising:
a first averaging circuit that obtains an average value of signals that are sequentially read in the first mode out of the unit pixels that are located in the reference pixel area;
a second averaging circuit that obtains an average value of signals that are sequentially read in the second mode out of the unit pixels that are located in the reference pixel area;
an offset calculating circuit that calculates a first offset value based on a difference between the average value that is obtained by the first averaging circuit and the average value that is obtained by the second averaging circuit;
another correction value generating circuit that generates a third correction value based on the average value that is obtained by the first averaging circuit;
another correction circuit that corrects, by using the third correction value, a signal read in the first mode out of the unit pixel that is located in the reference pixel area, a signal read in the first mode out of the unit pixel that is located in the light-receiving pixel area, and a signal read in the second mode out of the unit pixel that is located in the light-receiving pixel area; and
a third averaging circuit that obtains an average value of signals that are obtained through correction in which signals sequentially read in the first mode out of the unit pixels that are located in the reference pixel area are corrected by the another correction circuit,
wherein the correction value generating circuit generates the first correction value based on the average value that is obtained by the third averaging circuit, and generates the second correction value based on the average value that is obtained by the third averaging circuit and on the first offset value, and
wherein the correction circuit corrects, by using the first correction value, a signal obtained through correction in which the another correction circuit corrects the signal read in the first mode out of the unit pixel that is located in the light-receiving pixel area, and corrects, by using the second correction value, a signal obtained through correction in which the another correction circuit corrects the signal read in the second mode out of the unit pixel that is located in the light-receiving pixel area.

18. The image pickup apparatus according to claim 17, wherein the plurality of unit pixels located in the light-receiving pixel area include a first unit pixel and a second unit pixel, the first unit pixel being a pixel that is used in focus detection, the second unit pixel being a pixel that is irrelevant to the focus detection,
wherein the plurality of unit pixels located in the reference pixel area include a third unit pixel and a fourth unit pixel, the third unit pixel serving as a reference for the first unit pixel, the fourth unit pixel serving as a reference for the second unit pixel,
wherein the image pickup apparatus further comprises a fourth averaging circuit that obtains an average value of signals that are sequentially read in the first mode out of the third unit pixel,
wherein the offset calculating circuit calculates a second offset value based on a difference between the average value that is obtained by the first averaging circuit and the average value that is obtained by the fourth averaging circuit,
wherein the first correction value is for correcting a signal that is read in the first mode out of the second unit pixel, and
wherein the correction value generating circuit further generates a fourth correction value for correcting a signal that is read in the first mode out of the first unit pixel, based on the average value that is obtained by the third averaging circuit and on the second offset value.

19. An image pickup apparatus, comprising:
a pixel array including a plurality of unit pixels arranged into a matrix pattern, the plurality of unit pixels each including a plurality of photoelectric converters;
a driving circuit that drives the pixel array in any one of a first mode for reading a signal corresponding to combined electric charges that are obtained by combining electric charges separately generated by the plurality of photoelectric converters of each of the plurality of unit pixels, and a second mode for reading a signal corresponding to electric charges that are generated by any one of the plurality of photoelectric converters of each of the plurality of unit pixels;
a correction value generating circuit that generates a first correction value for correcting a signal that is read in the first mode out of the unit pixel that is located, in a row without using independently a signal read out in the second mode, in a light-receiving pixel area of the pixel array, and generates a second correction value that is different from the first correction value, for correcting a signal that is read in the second mode out of the unit pixel that is located, in a row using independently a signal read out in the second mode, in the light-receiving pixel area, based on signals that are read out of the unit pixels that are located in a reference pixel area of the pixel array; and
a correction circuit that corrects, by using the first correction value, the signal that is read in the first mode out of the unit pixel that is located in the light-receiving pixel area, and corrects, by using the second correction value, the signal that is read in the second mode out of the unit pixel that is located in the light-receiving pixel area.

* * * * *